(12) United States Patent
Tsubota

(10) Patent No.: US 6,606,701 B1
(45) Date of Patent: Aug. 12, 2003

(54) MICRO-PROCESSOR

(75) Inventor: Masashi Tsubota, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/448,299

(22) Filed: Nov. 24, 1999

(30) Foreign Application Priority Data

Nov. 30, 1998 (JP) .......................................... 10-339626

(51) Int. Cl.[7] .......................... G06F 9/312; G06F 13/14
(52) U.S. Cl. ...................... 712/207; 712/237; 711/213; 711/144; 710/52; 710/54
(58) Field of Search ............................... 712/219, 217, 712/207, 215, 206, 227, 245, 237; 711/213, 214, 168, 157, 212, 144; 710/104, 119, 116, 121, 123, 127, 263, 35, 34, 33, 61, 113, 52, 54

(56) References Cited

U.S. PATENT DOCUMENTS

| | | | | |
|---|---|---|---|---|
| 4,564,899 A | * | 1/1986 | Holly et al. | 710/104 |
| 4,755,933 A | * | 7/1988 | Teshima et al. | 711/157 |
| 5,313,591 A | * | 5/1994 | Acerill | 710/119 |
| 5,509,137 A | * | 4/1996 | Itomitsu et al. | 711/168 |

FOREIGN PATENT DOCUMENTS

| | | |
|---|---|---|
| JP | 59-68069 | 4/1984 |
| JP | 61-241833 | 10/1986 |
| JP | 62-80753 | 4/1987 |
| JP | 63-240631 | 10/1988 |
| JP | 63-269247 | 11/1988 |
| JP | 64-15853 | 1/1989 |
| JP | 64-72254 | 3/1989 |
| JP | 5-89031 | 4/1993 |
| JP | 5-108545 | 4/1993 |
| JP | 6-202982 | 7/1994 |
| JP | 6-208540 | 7/1994 |
| JP | 6-274450 | 9/1994 |
| JP | 7-219836 | 8/1995 |
| JP | 8-147208 | 6/1996 |
| JP | 9-106372 | 4/1997 |
| JP | 10-11964 | 1/1998 |

OTHER PUBLICATIONS

Japanese Office Action, dated Jul. 4, 2001, with English language translation of Japanese Examiner's comments, 1100368–0034.

Japanese Office Action with English translation of pertinent portions dated Dec. 25, 2002.

* cited by examiner

*Primary Examiner*—Daniel H. Pan
(74) *Attorney, Agent, or Firm*—Whitham, Curtis & Christofferson, P.C.

(57) ABSTRACT

There is provided a micro-processor including (a) a pre-fetch cue FIFO which fetches and stores therein a command code, (b) a pre-fetch cue valid indicating that an effective command code is stored in the pre-fetch cue FIFO, (c) an access priority judging circuit receiving a pre-fetch request signal indicating that there is vacancy in the pre-fetch cue FIFO, a cue empty signal indicating that the pre-fetch cue FIFO is entirely empty, and an operand data request signal indicating that there has been generated an operand data access, and determining a kind of next bus access, (d) a bus state control circuit transmitting a bus interface signal, based on the kind of next bus access having been determined by the access priority judging circuit, and also transmitting a burst transfer signal indicating that a memory is in a condition for carrying out burst transfer, and (e) an access register storing data about the previous bus access. The access priority judging circuit takes a command fetch access in preference to an operand data access in the next bus access when data stored in the access register is a command fetch access, and the pre-fetch request signal, the operand data request signal, and the burst transfer signal are all transmitted.

16 Claims, 17 Drawing Sheets

MICRO-PROCESSOR

BACKGROUND OF THE INVENTION

1. Field of the Invention

The invention relates to a data processing apparatus, and more particularly to a micro-processor having a bus interface function.

2. Description of the Related Art

A cache memory may be incorporated into a microprocessor for enhancing system performances. Such a micro-processor including a cache memory therein can accomplish its maximum performance when the cache memory is hit, but would have performances the same as or inferior to performances of a system including no cache memory, when the cache memory is incorrectly hit. In particular, it is necessary in a system carrying out real-time control to estimate a process time on the assumption that a memory access performance is at a minimum. Hence, if such a system has to carry out irregular process such as interruption, a hit rate of a cache memory cannot avoid from being reduced, resulting in reduction in performances due to cache—replace.

In a system for carrying out real-time control, there are increased applications which require multi-media processing such as image processing and audio processing. Thus, there is increased a demand for a micro-processor which can carry out both real-time control and data processing. Hence, a system for carrying out real-time control, including no cache memory, is also required to enhance capability of making access to an external memory, an external device, and so on. As a function for enhancing access performance, here is known a burst transfer function.

A pre-fetch queue FIFO 101 fetches and stores therein a command code. A pre-fetch queue valid 103 indicates that an effective command code is stored in the pre-fetch queue FIFO 101. A queue clear signal 104 is generated when a branch command or interruption is to be carried out, and is transmitted to the pre-fetch queue valid 103.

A pre-fetch request signal 107 is transmitted from OR circuit 105 to an access priority judging circuit 111. The pre-fetch request signal 107 is made active when the pre-fetch queue FIFO 101 has a vacancy therein. A queue empty signal 108 is transmitted from an inverter 106 to the access priority judging circuit 111. The queue empty signal 108 is made active when the pre-fetch queue FIFO 101 is entirely empty. An operand data request signal 109 is transmitted to the access priority judging circuit 111. The operand data request signal 109 is made active when operand data access 109a is generated.

The access priority judging circuit 111 determines a kind of access to be generated next. A bus state control circuit 122 generates a bus state in accordance with access having been determined by the access priority judging circuit 111.

The bus state control circuit 122 transmits a bus state signal, a T1 state signal and a T2 state signal to a bus timing producing circuit 126 in accordance with bus access signals 123, 124 and 125. The T1 state signal first outputs an address and a control signal. The T2 state signal makes access to a memory, a device and so on, following the T1 state signal.

The bus state control circuit 122 transmits a priority judging signal 116 to the access priority judging circuit 111. The priority judging signal 116 is a timing signal for judging a priority of next address.

The bus timing producing circuit 126 generates bus timing signals 127 and 128 in accordance with the T1 and T2 state signals 123 and 124 transmitted from the bus state control circuit 122.

As illustrated in FIG. 2, a micro-processor 150 including therein a bus interface having such a structure as illustrated in FIG. 1 and having been explained above is connected to both a first memory 151 and a second memory 152 through a system bus 153. The first memory 151 has a function of carrying out burst transfer and stores therein a command code. The second memory 152 makes operand data access. For instance, the first memory 151 may be constituted as a read only memory (ROM) having a paging function, or as a synchronous FLASH memory, and the second memory 152 may be constituted as SRAM or DRAM.

Hereinbelow is explained an operation of the above-mentioned bus interface illustrated in FIG. 1.

When a program is to be carried out in branch, the pre-fetch queue valid 103 is made entirely invalid by means of the queue clear signal 104, and queue empty signal 108 is made active.

The access priority judging circuit 111 determines a kind of bus access on receipt of the priority judging signal 116, and transmits a command fetch access signal 113 or an operand data access signal 114 to the bus stat control circuit 122. The access priority judging circuit 111 activates the operand data access signal 114 when both the pre-fetch request signal 107 and the operand data request signal 109 are received. As an alternative, the access priority judging circuit 111 may be designed to activate the command fetch access signal 113 when the queue empty signal 108 is active.

The bus state control circuit 122 transmits the T1 state signal, the T2 state signal and the bus state signal to the bus timing generating circuit 126 in accordance with the bus access signals 123, 124 and 125. The bus timing generating circuit 126 makes access to external ROM or RAM, and carries out command fetch access or operand data access.

In burst transfer, there is first generated a state (hereinafter, referred to as "T1 state") for outputting an address, a control signal and so on, and subsequently is generated a state (hereinafter, referred to as "T2 state") for making access to a memory, a device and so on. If a memory or device fulfills a requirement for carrying out burst transfer when access is to be made to successive addresses in the same memory, only T2 state is generated for making access to the later address. That is, it would be possible to accomplish high-speed memory access in burst transfer, since T1 state is not generated in the second or later access in successive access.

Time necessary for generating T1 or T2 state is dependent on a specific memory. As an example of a memory having a function of burst transfer, there is a memory which makes use of successive high-speed access to a memory cell associated with a selected address, or a memory having a interleave structure.

In general, a micro-processor carries out a command through the steps of (a) making access to a memory for fetching a command code, (b) storing the command code in a pre-fetch queue, (c) data-aligning the command code, and (d) decoding the command code to thereby identify a command, and carrying out the thus identified command. A micro-processor further carries out the step of (e) making access to a memory for writing data thereinto or reading data out thereof, when a specific command is to be carried out.

In the above-mentioned steps, access to a memory in the step (a) for fetching a command code is called command fetch access, and access to a memory in the step (e) for writing data thereinto or reading data out thereof is called operand data access.

In accordance with command fetch access, since access is to be made successively in an order of address except branching, it would be possible to accomplish high-speed access in burst transfer through the use of a memory having a function of carrying out burst transfer.

On the other hand, operand data access is characterized in that address is seldom successive except that block transfer is to be carried out, and that an interval between addresses is not constant.

Comparing a priority of command fetch access to a priority of operand data access, operand data access has a higher priority. Hence, if a request of operand data access is made while burst transfer of command fetch is being carried out, the burst transfer is interrupted, and operand data access is carried out.

In the conventional micro-processor, if an operand data request 109 is made to another memory while command fetch of T1, T2, T2, T2, - - - are successively made access in burst transfer, the burst transfer is interrupted, and operand data access is carried out. Thereafter, command fetch is made to restart. First memory access after restarting this command fetch is T1 and T2, and accordingly, it is not possible to carry out burst transfer starting from T2 state.

Hence, if burst transfer of command fetch is automatically interrupted when an operand data request 109 is made, burst transfer of command fetch is frequently interrupted in accordance with a frequency at which operand data access is to be made, resulting in a problem that transfer capability by burst transfer cannot be adequately drawn out.

In particular, since operand data access is seldom successively made, and an interval between operand data accesses is not constant, it would occur that command fetch and operand data are alternately accessed, resulting in high possibility that advantageous effects of burst transfer cannot be obtained.

In general, burst transfer is completed when burst transfer reaches a certain condition, and then, access starts to be made again from T1 state. For instance, when a memory having a function of burst transfer or a memory having a function of paging at a high speed is employed, the number of burst transfer may be determined in advance on the basis of a structure of an employed memory, or burst transfer may be completed at a word boundary or at a half-word boundary. In such a case, if an operand data request 109 is made immediately before an access is made to a memory which access is earlier by one than a boundary condition at which burst transfer of command fetch is completed, the burst transfer of command fetch is interrupted, and operand data access is carried out. Then, command fetch access earlier by one than the boundary condition at which burst transfer is completed is carried out from T1 state, and thereafter, command fetch access at the boundary condition at which burst transfer is completed is carried out from T1 state. As a result, there is caused a problem that burst transfer of command fetch is interrupted in an access immediately before the boundary condition, and an access is restarted twice in sequence from T1 state, which makes it impossible to draw out transfer capability of a bus interface.

In addition, contrary to burst transfer of command fetch, a micro-processor which, on receipt of the queue empty signal 108 while operand data access is being carried out in burst transfer, interrupts the burst transfer by the queue empty signal 108, and carries out command fetch access is also accompanied with a problem that first access to a memory, to be made when operand data access is restarted, starts only from T2 state. Accordingly, if burst transfer of operand data access is automatically interrupted when the queue empty signal 108 is transmitted, burst transfer of operand data access may be interrupted, which would make it impossible to draw out transfer capability of a bus interface.

Japanese Unexamined Patent Publication No. 64-72254 has suggested a data processing apparatus comprised of a data buffer for temporarily storing data therein, means for managing an amount of data stored in the data buffer, and a burst register for setting the number of successive data transfer. The number of successive data transfer in a single data-transfer sequence is determined in accordance with an amount of data stored in the data buffer, and the thus determined number is set in the burst register.

Japanese Unexamined Patent Publication No. 62-80753 has suggested a bus controller in which a plurality of controllers are commonly used for data transfer, and use of the controllers is managed by a managing device. The managing device includes a circuit which assigns priority to transfer request signals transmitted from the controllers, and allows the controller to which top priority is assigned, to use a common bus while the transfer request signal is being transmitted. At least one of the controllers has two lines in which a transfer request signal is transmitted, and alternately turns a transfer request signal on or off in every data transfer. The managing device allows a controller having second top priority to use a common bus when the transfer request signal is switched.

Japanese Unexamined Patent Publication No. 6-274450 has suggested a data transfer system including CPU which transmits and receives data in single transfer in which data associated with one address is transferred at a time, a bus which transfers data in burst transfer in which data associated with a plurality of successive addresses is transferred at a time, a data reader which is electrically connected to the bus, and reads data out of the bus in burst transfer, an address transmitter which is electrically connected between CPU and the bus, and transmits an address to the data reader through the bus, which address corresponds to one of addresses transmitted from CPU for reading data, a transfer buffer which temporarily stores data having been read out of the data reader through the bus in burst transfer on the basis of the address transmitted from CPU, and means for reading data stored in the transfer buffer, in accordance with the addresses transmitted from CPU, and transferring the data to CPU in single transfer.

Japanese Unexamined Patent Publication No. 5-89031 has suggested a micro-processor which makes access to a device in a bus cycle comprising a first state for preparation of access of a device and a second state for allowing a device to make access. The micro-processor is comprised of a decoder for detecting a command to access successive addresses and decoding the addresses, an indicator for indicating that a bus cycle to be carried out is successive addresses, a detector for detecting as to whether the device is able to successively access, and a controller which successively carries out device access through a first bus cycle comprising both the first and second states and second or later bus cycle consisting of the second state, in accordance with an instruction transmitted from the indicator.

Japanese Unexamined Patent Publication No. 6-208540 has suggested a bus master module device including a direct memory access controller which ceases using a system bus at a predetermined timing while burst transfer is being carried out by occupying the system bus, and allows other module to occupy the system bus, a masking circuit which detects that the system bus is ceased to use by the direct memory access controller, and interrupts a path through which an allowance for using the system bus is supplied, before the direct memory access controller is allowed again to use the system bus, and a sensing circuit which transmits a signal to the other module, indicating that masking has been completed by the masking circuit.

The above-mentioned problems remain unsolved even by the above-mentioned Japanese Publications.

SUMMARY OF THE INVENTION

Hence, in view of the above-mentioned problems, it is an object of the present invention to provide a micro-processor having a function of bus interface, which is capable of suppressing interruption of burst transfer of command fetch, reducing overhead of T1 state which is generated when command fetch is restarted to carry out after operand data access has been carried out, and resultingly enhancing capability in data transfer in a bus interface.

It is also an object of the present invention to provide a micro-processor having a function of bus interface, which is capable of suppressing interruption of burst transfer in a cue empty signal, reducing overhead of T1 state which is generated when operand data access is restarted to carry out after command fetch access has been carried out, and resultingly enhancing capability in data transfer in a bus interface.

In one aspect of the present invention, there is provided a micro-processor including (a) a pre-fetch queue FIFO which fetches and stores therein a command code, (b) a pre-fetch queue valid indicating that an effective command code is stored in the pre-fetch queue FIFO, (c) an access priority judging circuit receiving a pre-fetch request signal indicating that there is a vacancy in the pre-fetch queue FIFO, a queue empty signal indicating that the pre-fetch queue FIFO is entirely empty, and an operand data request signal indicating that there has been generated an operand data access, and determining a kind of next bus access, (d) a bus state control circuit transmitting a bus interface signal, based on the kind of next bus access having been determined by the access priority judging circuit, and also transmitting a burst transfer signal indicating that a memory is in a condition for carrying out burst transfer, and (e) an access register storing data about the previous bus access, the access priority judging circuit taking a command fetch access in preference to an operand data access in the next bus access when data stored in the access register is a command fetch access, and the pre-fetch request signal, the operand data request signal, and the burst transfer signal are all transmitted.

The micro-processor may further include (f) a first register storing a condition at which burst transfer of a command fetch is completed, and (g) a first comparator receiving the next command fetch address and the condition transmitted from the first register to thereby detect a boundary condition of a memory, and transmitting a first signal indicating that burst transfer should be completed, as a result of detecting the boundary condition, the access priority judging circuit making judgement as to whether a command fetch access should be taken preference over an operand data access in the next bus access in accordance with the first signal, when data stored in the access register is a command fetch access, and the pre-fetch request signal, the operand data request signal, and the burst transfer signal are all transmitted.

The micro-processor may further include (h) a first counter counting the number of burst transfer, (i) a second register storing the number of burst transfer in a command fetch, and (j) a second comparator comparing the number of burst transfer counted by the first counter to the number of burst transfer stored in the second register, and transmitting a second signal indicating that burst transfer should be completed, as a result of comparison, the access priority judging circuit making judgement as to whether a command fetch access should be taken preference over an operand data access in the next bus access in accordance with the second signal, when data stored in the access register is a command fetch access, and the pre-fetch request signal, the operand data request signal, and the burst transfer signal are all transmitted.

The micro-processor may further include (k) a detector detecting that a command code in the pre-fetch queue FIFO is smaller than a predetermined amount, on the basis of the pre-fetch queue valid, and transmitting a third signal indicating that burst transfer should be completed, as a result of detection, the access priority judging circuit making judgement as to whether a command fetch access should be taken preference over an operand data access in the next bus access in accordance with the third signal, when data stored in the access register is a command fetch access, and the pre-fetch request signal, the operand data request signal, and the burst transfer signal are all transmitted.

The micro-processor may further include (l) a second counter counting the number of burst transfer, (m) a third register storing the number of burst transfer in operand data access, and (n) a third comparator comparing the number of burst transfer counted by the second counter to the number of burst transfer stored in the third register, and transmitting a fourth signal indicating that burst transfer should be completed, as a result of comparison, the access priority judging circuit giving first priority to the cue empty signal, second priority to the operand data request signal, and third priority to the pre-fetch request signal, respectively, the access priority judging circuit making judgement as to whether an operand data access should be taken preference over a command fetch access in the next bus access in accordance with the fourth signal, when data stored in the access register is an operand data access, and the cue empty signal, the operand data request signal, and the burst transfer signal are all transmitted.

The micro-processor may further include (o) a fourth register storing a condition at which burst transfer in operand data is completed, and (p) a fourth comparator receiving the next operand data address and the condition transmitted from the fourth register to thereby detect a boundary condition of a memory, and transmitting a fifth signal indicating that burst transfer should be completed, as a result of detecting the boundary condition, the access priority judging circuit giving first priority to the cue empty signal, second priority to the operand data request signal, and third priority to the pre-fetch request signal, respectively, the access priority judging circuit making judgement that the next bus address is operand data access in accordance with the fifth signal, when data stored in the access register is an operand data access, and the cue empty signal, the operand data request signal, and the burst transfer signal are all transmitted.

There is further provided a micro-processor having a bus interface function, the micro-processor determining a priority of a bus access, based on data about a kind of the previous bus access, data about a condition at which burst transfer of the next bus access can be carried out, and data about a condition at which the number of burst transfer reaches a predetermined number.

There is still further provided a micro-processor having a bus interface function, the micro-processor, if pre-fetch cue makes a request to carry out burst transfer while burst transfer of operand data access is being carried out, keeps the request pending until the burst transfer of operand data access is completed.

There is yet further provided a micro-processor including (a) a bus interface in which a request of operand data is given a higher priority than a request of command fetch, (b) an access register storing data about the previous access, the micro-processor, if a request of operand data is made while burst transfer access for command fetch is being carried out, determining whether burst transfer should be interrupted or continued, based on data stored in the access register.

It is preferable that the micro-processor takes command fetch access in preference to operand data access, while a first signal is being transmitted which first signal indicates that a memory is put in such a condition that burst transfer of the next access can be carried out.

There is further provided a micro-processor including (a) a bus interface in which a request of operand data is given a higher priority than a request of command fetch, (b) an access register storing data about the previous access, the micro-processor, if a request of operand data is made while burst transfer access for command fetch is being carried out, taking command fetch access in preference to operand data access until a first or second signal is transmitted, the first signal indicating that a memory is put in such a condition that burst transfer of the next access can be carried out, the second signal indicating that burst transfer should be completed.

There is further provided a micro-processor including (a) a bus interface in which a request of operand data is given a higher priority than a request of command fetch, (b) an access register storing data about the previous access, the micro-processor, if a request of operand data is made while burst transfer access for command fetch is being carried out, taking command fetch access in preference to operand data access when first and second signals are transmitted, the first signal indicating that a memory is put in such a condition that burst transfer of the next access can be carried out, the second signal indicating that burst transfer should be completed.

In another aspect of the present invention, there is provided a method of driving a micro-processor, including the step of taking command fetch access in preference to operand data access in the next bus access, when the following conditions are all fulfilled: (a) the previous bus access is command fetch access; (b) there is a vacancy in pre-fetch queue FIFO; (c) there is generated operand data access; and (d) a memory is in such a condition that burst transfer can be carried out.

There is further provided a method of driving a micro-processor, including the steps of (a) storing a condition at which burst transfer of command fetch is completed, (b) detecting a boundary condition of a memory, based on the next command fetch address and the condition, and (c) judging whether command fetch access should be taken preference over operand data access in the next bus access in accordance with a result of detection carried out in the step (b), when the above-mentioned conditions are all fulfilled.

There is still further provided a method of driving a micro-processor, including the steps of (a) counting the number of burst transfer, (b) storing the number of burst transfer in command fetch, (c) comparing the number in the step (a) to the number in the step (b), and (d) judging whether command fetch access should be taken preference over operand data access in the next bus access in accordance with a result of comparison carried out in the step (c), when the above-mentioned conditions are all fulfilled.

There is yet further provided a method of driving a micro-processor, including the steps of (a) detecting an amount of command code in pre-fetch queue FIFO, (b) judging whether command fetch access should be taken preference over operand data access in the next bus access, if the amount of command code is smaller than a predetermined amount, and if the above-mentioned conditions are all fulfilled.

There is further provided a method of driving a micro-processor, including the step of determining a priority of a bus access, based on data about a kind of the previous bus access, data about a condition at which burst transfer of the next bus access can be carried out, and data about a condition at which the number of burst transfer reaches a predetermined number.

There is further provided a method of driving a micro-processor, including the step of, if pre-fetch cue makes a request to carry out burst transfer while burst transfer of operand data access is being carried out, pending the request until the burst transfer of operand data access is completed.

There is further provided a method of driving a micro-processor, including the steps of (a) giving a priority to a request of operand data over a request of command fetch, (b) storing data about the previous access, and (c) if a request of operand data is made while burst transfer access for command fetch is being carried out, determining whether burst transfer should be interrupted or continued, based on data stored in the access register.

It is preferable that command fetch access is taken preference over operand data access in the step (c), while a first signal is being transmitted which first signal indicates that a memory is put in such a condition that burst transfer of the next access can be carried out.

There is further provided a method of driving a micro-processor, including the steps of (a) giving a priority to a request of operand data over a request of command fetch, (b) storing data about the previous access, and (c) if a request of operand data is made while burst transfer access for command fetch is being carried out, taking command fetch access in preference to operand data access until a first or second signal is transmitted, the first signal indicating that a memory is put in such a condition that burst transfer of the next access can be carried out, the second signal indicating that burst transfer should be completed.

There is further provided a method of driving a micro-processor, including the steps of (a) giving a priority to a request of operand data over a request of command fetch, (b) storing data about the previous access, and (c) if a request of operand data is made while burst transfer access for command fetch is being carried out, taking command fetch access in preference to operand data access when first and second signals are transmitted, the first signal indicating that a memory is put in such a condition that burst transfer of the next access can be carried out, the second signal indicating that burst transfer should be completed.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

In a conventional bus interface, if an operand data request 109 is made while burst transfer of command fetch is being carried out, operand data access is carried out in the next bus access in preference to command fetch.

Figure 4:
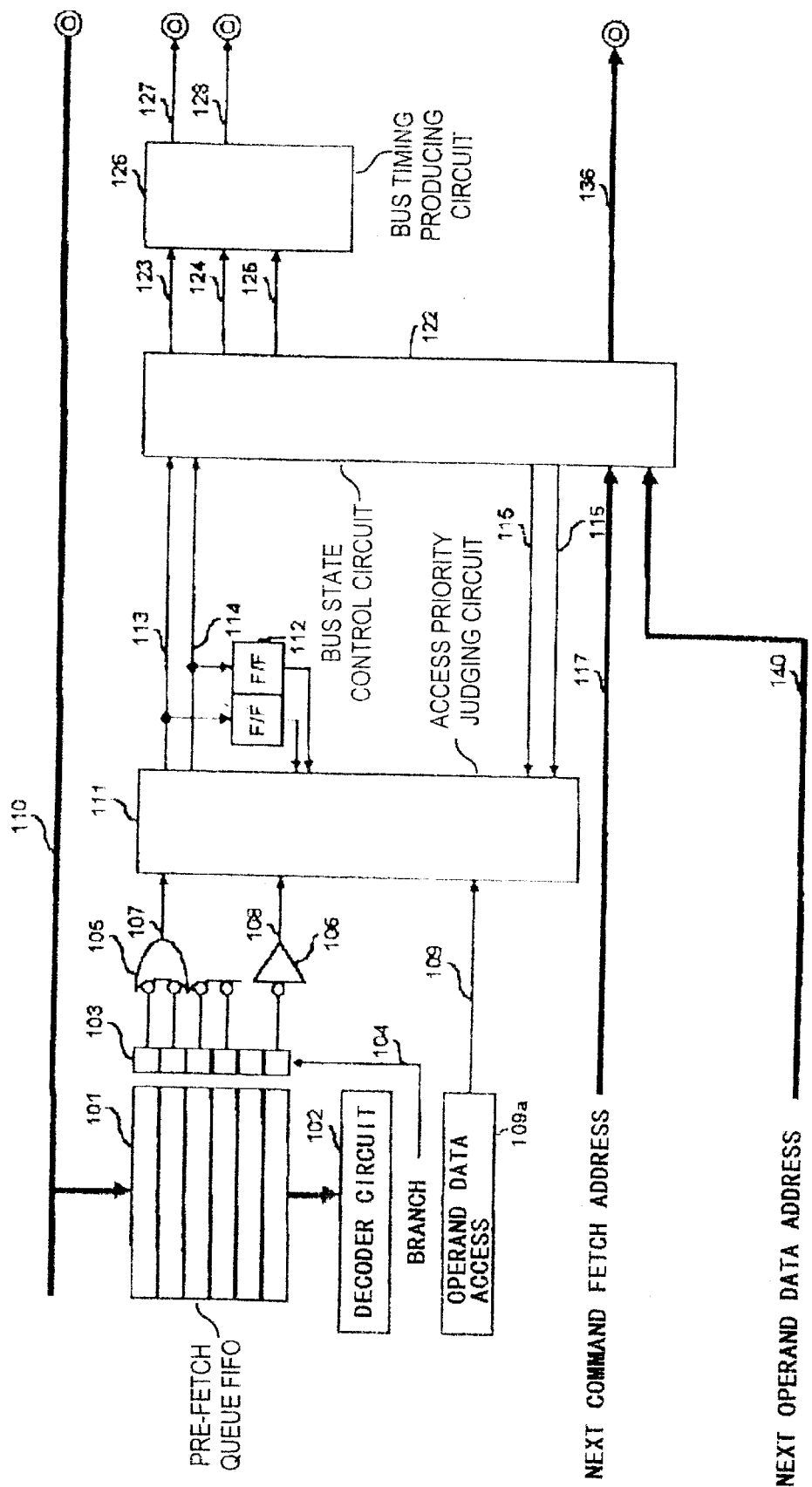
FIG. 4 is a block diagram of a bus interface in accordance with the first embodiment.

In contrast, the first embodiment explained hereinbelow in detail with reference to FIG. 4 is characterized in that command fetch access is carried out in preference to operand data access, while a burst transfer signal 115 indicating that a memory is in such a condition that the next access can be carried out in burst transfer (successive T2 state) is being transmitted.

The first embodiment provides a micro-processor including a bus interface in which a operand data request has a priority over a command fetch request regardless of presence or absence of the cue empty signal 108, and further including an access register 112 storing data about the previous access. If an operand data request is made while burst transfer access for command fetch is being carried out, the micro-processor in accordance with the first embodiment judges whether burst transfer is interrupted or continued, based on data stored in the access register 112.

The access register 112 stores which access was carried out in the previous bus access between command fetch access and operand data access. If command fetch access was carried out in the previous bus access, the access register 112 so stores, if operand data access was carried out in the previous bus access, the access register 112 so stores. That is, the access register 112 stores therein what kind of access was carried out.

An access priority judging circuit 111 takes a command fetch access in preference to an operand data access in the next bus access when the following requirements are all fulfilled: (a) data stored in the access register 112 is a command fetch access; (b) a pre-fetch request signal 107 and an operand data request signal 109 are transmitted, and (c) a burst transfer signal 115 indicating that a memory is in such a condition that the next access can be carried out in burst transfer (successive T2 state) is transmitted.

The access priority judging circuit 111 carries out command fetch access in burst transfer in preference to operand data access until pre-fetch queue FIFO 101 is entirely filled or the burst transfer signal 115 becomes inactive, and thereafter, carries out operand data access.

Figure 3:
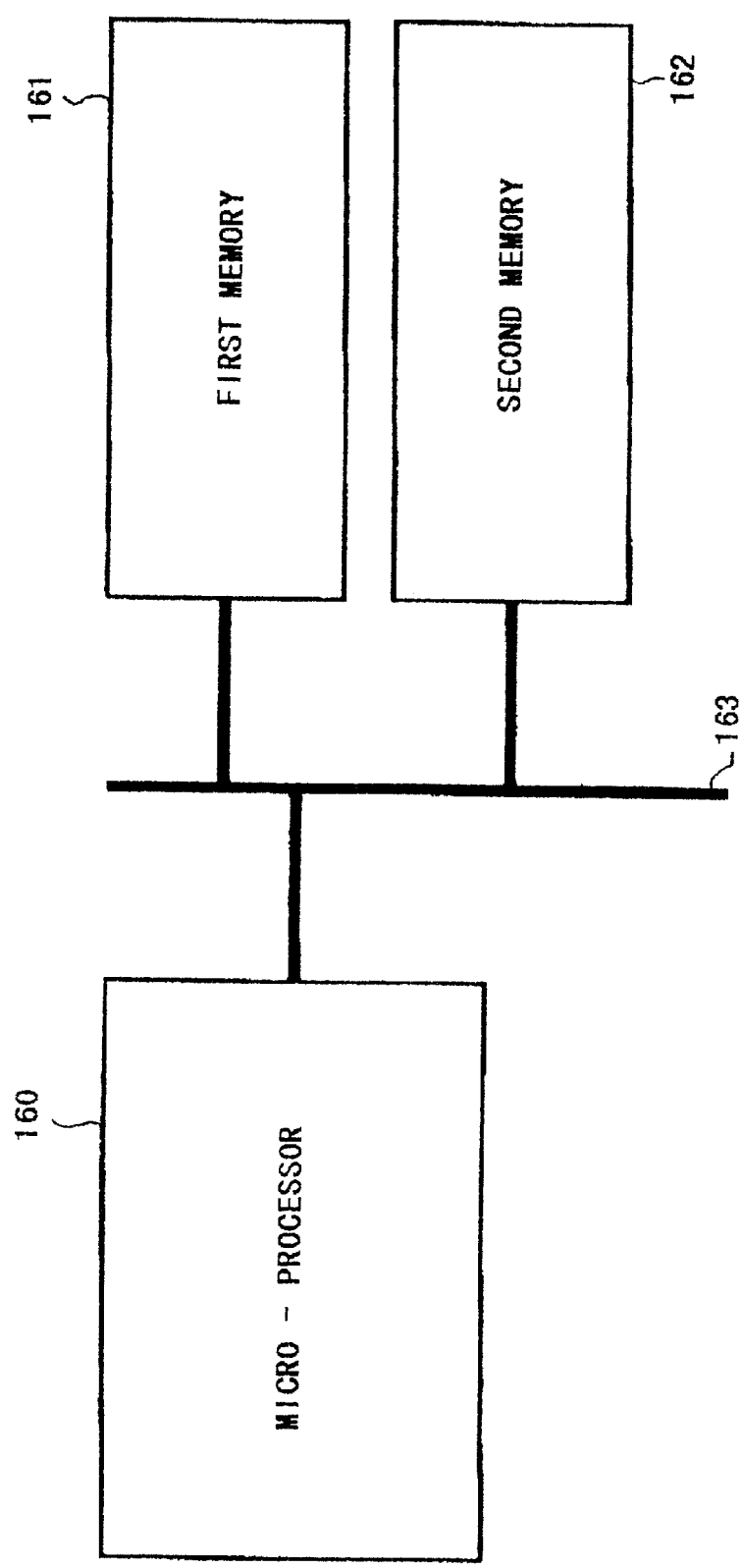
FIG. 3 is a block diagram of a system comprised of a micro-processor and memories, in accordance with the first, third, fourth and fifth embodiments of the present invention.

FIG. 3 is a block diagram of a system. As illustrated in FIG. 3, the micro-processor 160 is electrically connected to both a first memory 161 and a second memory 162 through a system bus 163. The first memory 161 can carry out burst transfer of addresses by the number of 8 multiplied by a positive integer (8, 16, 24, - - - ), and stores a command code therein. The second memory 162 can carry out burst transfer of addresses by the number of 4 multiplied by a positive integer (4, 8, 12, - - - ), and stores operand data therein.

Figure 1:
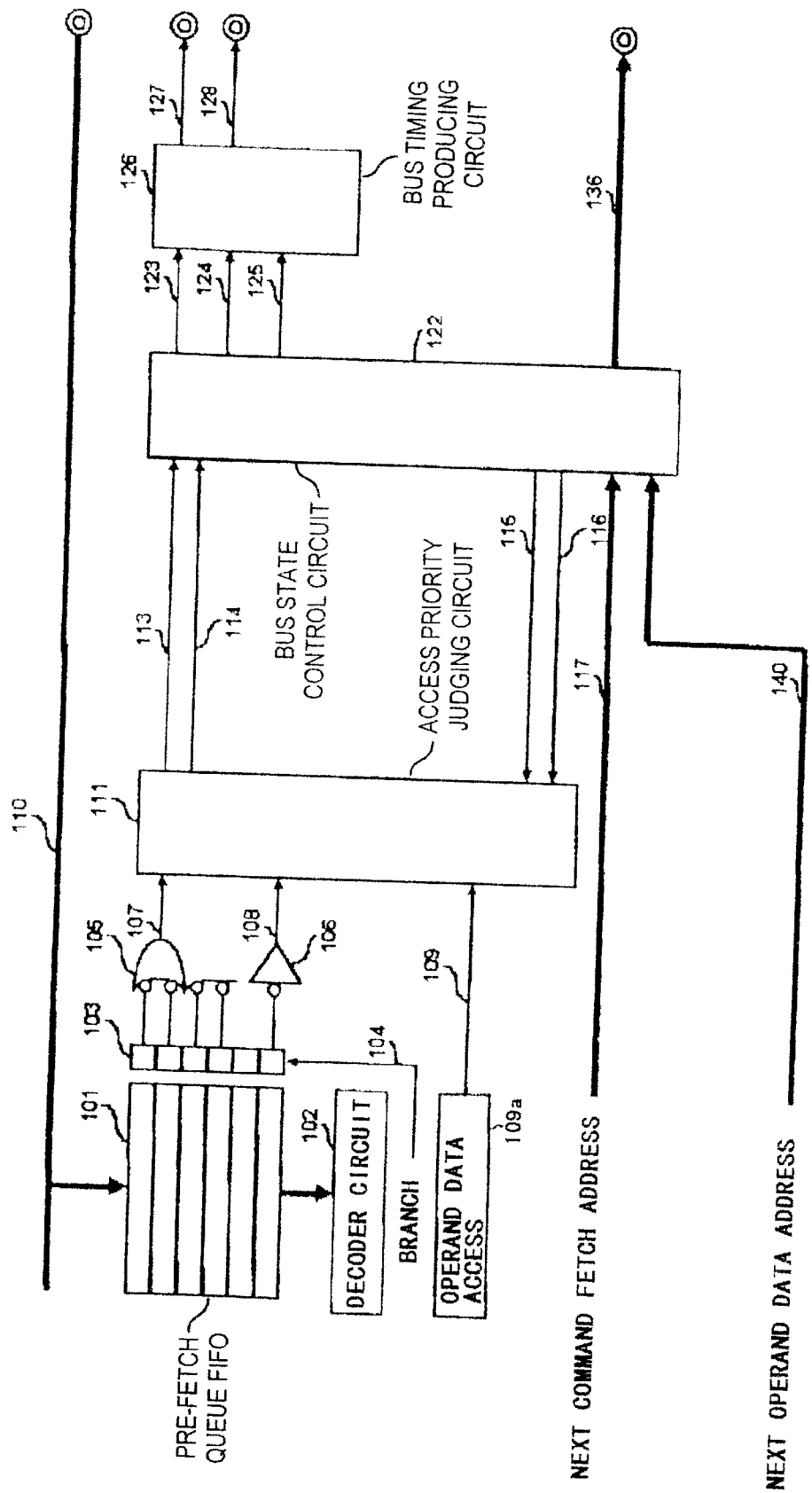
FIG. 1 is a block diagram of a conventional bus interface.
Figure 2:
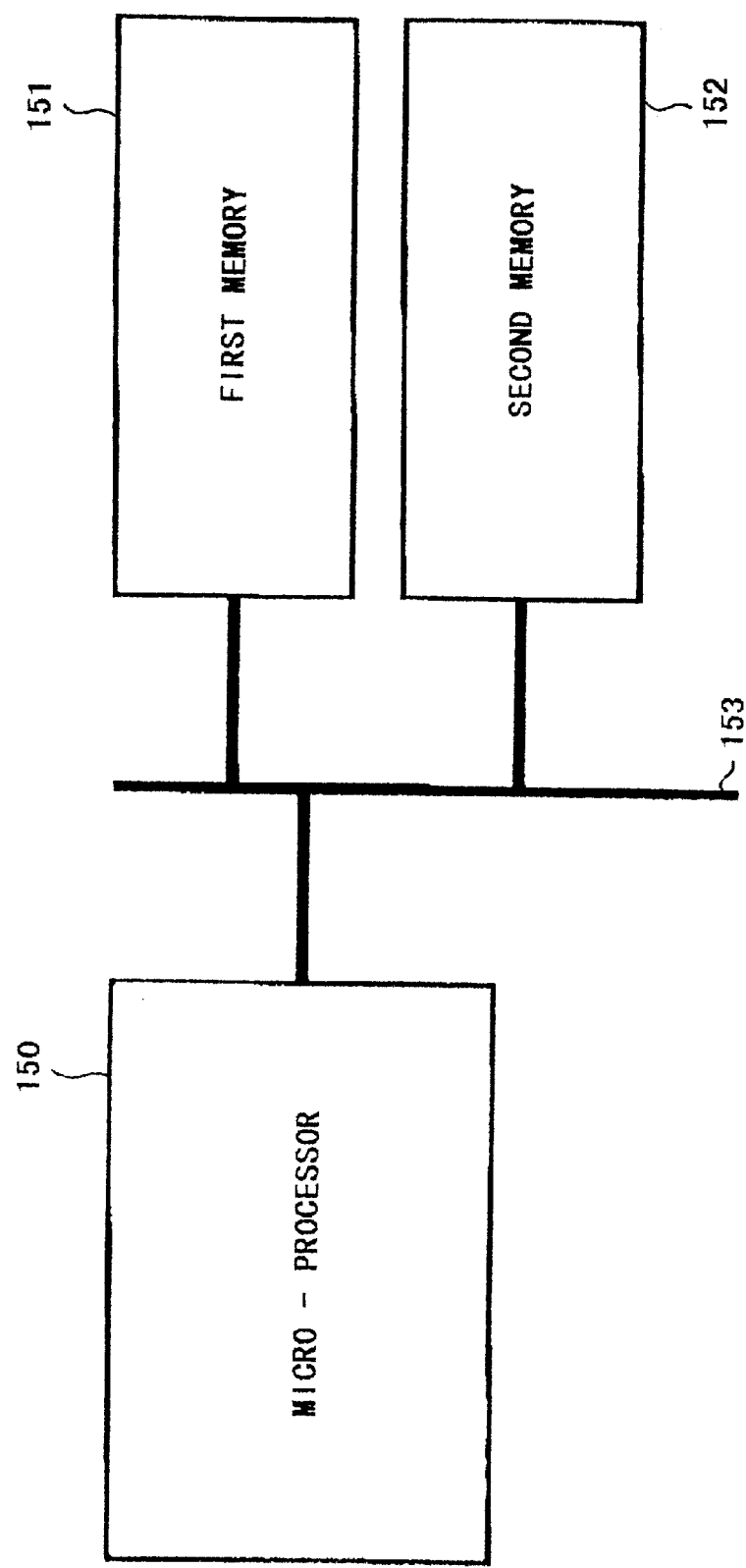
FIG. 2 is a block diagram of a conventional system comprised of a micro-processor and memories.

Hereinbelow is explained a structure of a bus interface of the micro-processor in accordance with the first embodiment, with reference to FIG. 4. Parts or elements that correspond to those of the conventional micro-processor illustrated in FIG. 1 have been provided with the same reference numerals, and are not explained hereinbelow.

A bus state control circuit 122 transmits a priority judging signal 116 to the access priority judging circuit 111. The priority judging signal 116 becomes active when a bus access is completed, and the active priority judging signal 116 is used by the access priority judging circuit 111 to judge a priority of the next bus access. Accordingly, the priority judging signal 116 becomes active in T2 state or Ti state. Herein, Ti state indicates an idle condition where there is no bus access in a bus interface.

A timing at which a priority is judged is sampled at a middle of each of states, and a signal is transmitted at a beginning of the next state.

The bus state control circuit 122 further transmits a burst transfer signal 115. The burst transfer signal 115 is made active when a memory is in such a condition that the next access is carried out in burst transfer (succession of T2 state).

The bus state control circuit 122 stores data about the maximum number of burst transfer for each of memories and data as to how many times it is able to further carry out burst transfer.

Hereinbelow is explained an operation of the micro-processor in accordance with the first embodiment, with reference to FIG. 5.

At time 1, T1 state access of command fetch is being carried out, and the pre-fetch request signal 107 is active, and both the cue empty signal 108 and the operand data request signal 109 are inactive.

At time 2, T2 state access of command fetch is being carried out. Since the priority judging signal 116 becomes active, the access priority judging circuit 111 determines the next bus access. At this time, since both the pre-fetch request signal 116 and the burst transfer signal 111 are active, burst transfer of command fetch is determined as the next bus access in accordance with the logic table shown as Table 1.

Since the same conditions are kept from T3 to T8, burst transfer of command fetch is activated eight times.

TABLE 1

| | 1 | 2 | 3 | 4 | 5 | 6 | 7 | 8 | 9 |
|---|---|---|---|---|---|---|---|---|---|
| Access register (112) | x | x | x | fetch | fetch | x | data | fetch | data |
| Pre-fetch request signal (107) | 0 | 0 | x | 1 | 1 | 1 | 1 | 1 | x |
| Cue empty signal (108) | 0 | 0 | 1 | 0 | 0 | 0 | 0 | 0 | x |
| Operand data request signal (109) | 0 | 1 | x | 0 | 1 | 1 | 1 | 1 | 1 |
| Burst transfer signal (115) | x | x | x | x | 1 | 0 | 1 | 1 | 1 |
| Burst transfer completion signal (121) | x | x | x | x | 0 | x | x | 1 | 0 |
| Next access (Invention) | idle | data | fetch | fetch | fetch | data | data | data | data |
| Next access (Prior art) | idle | data | fetch | fetch | data | data | data | data | fetch |

In Table 1, column 5 indicates the first to fourth embodiments, and the column 9 indicates the fifth and sixth embodiments. The sign "x" indicates that it is available under any conditions, the term "fetch" means a command fetch access, the term "data" means an operand data access, and the term "idle" means that there is no access.

At time 9, the burst transfer signal 115 becomes inactive. That is, since the number of burst transfer in a memory reaches its maximum number, T1 state of command fetch is determined as the next bus access.

During time 11 to 12, the same operation as the operation carried out at time 1 to 3 is repeated.

At time 13, since the pre-fetch request signal 107 becomes inactive and there is no other access request, burst transfer is completed, and T2 state is changed into Ti state.

At time 15, the pre-fetch request signal 107 becomes active again. Hence, command fetch starts, similarly to time 1.

At time 17, burst transfer of command fetch is determined as the next bus access.

At time 18, the operand data request signal 109 transmitted to the second memory 162 becomes active. Since the access register 112 which stores data about the previous access stores command fetch access, the access priority judging circuit 111 makes judgement in accordance with Table 1, and determines command fetch as the next bus access, until the burst transfer signal 115 becomes inactive.

At time 19 and 20, the operand data request signal 109 is kept pending to carry out, and command fetch access is carried out in preference to operand data access.

At time 21, the burst transfer signal 115 becomes inactive. That is, since the number of burst transfer in the first memory 161 reaches its maximum number, the operand data request signal 109 which have been kept waiting from time 18 is judged, and operand data access is determined as the next bus access. Thus, operand data access is started from T1 state.

At time 23, T2 state of operand data access is being carried out. At this time, since the pre-fetch request signal 116, the operand data request signal 109 and the burst transfer signal 115 are all active, and the access register 112 stores operand data access therein, operand data access is determined as the next bus access in accordance with Table 1.

At time 24 and 25, since a condition is kept the same as the condition at time 23, operand data access is carried out in burst transfer.

At time 26, the operand data request signal 109 becomes inactive. Hence, operand data access is completed, and command fetch access is determined as the next bus access.

Figure 5:
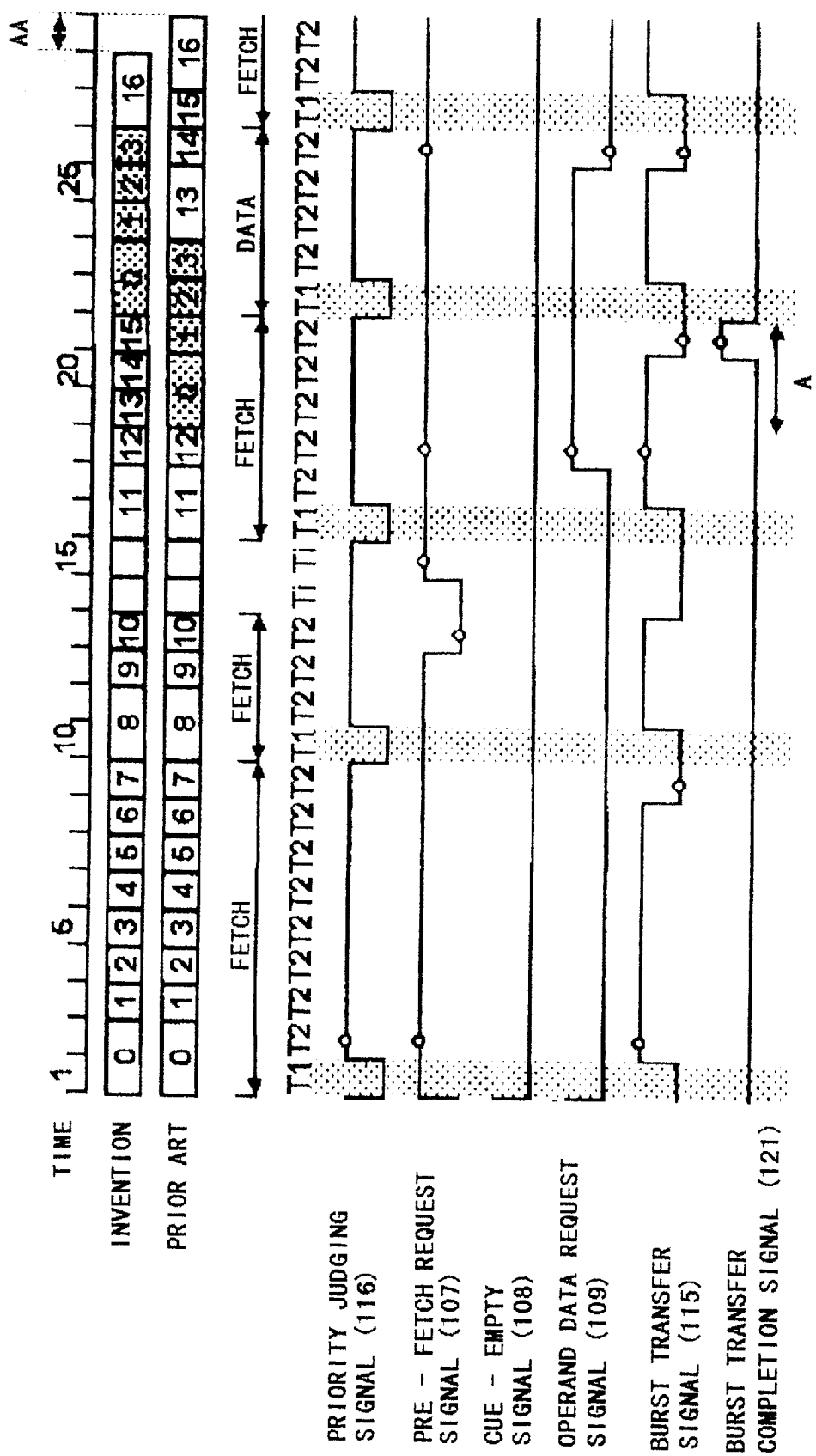
FIG. 5 is a timing chart of the bus interface in accordance with the first embodiment.

As having been explained so far, in accordance with the first embodiment, the operand data request signal 109 is kept waiting in a period A, and burst transfer of command fetch is carried out in preference to operand data access, as shown in FIG. 5. As a result, it is possible to enhance bus interface performance by one state in comparison with prior art, as shown in FIG. 5 with a difference AA in performance between the invention and prior art.

Second Embodiment

A micro-processor in accordance with the second embodiment is explained hereinbelow with reference to FIGS. 6 to 8.

In accordance with the second embodiment, when an operand data request is made while burst transfer access for command fetch is being carried out, the burst transfer is ceased or continued as follows.

Figure 7:
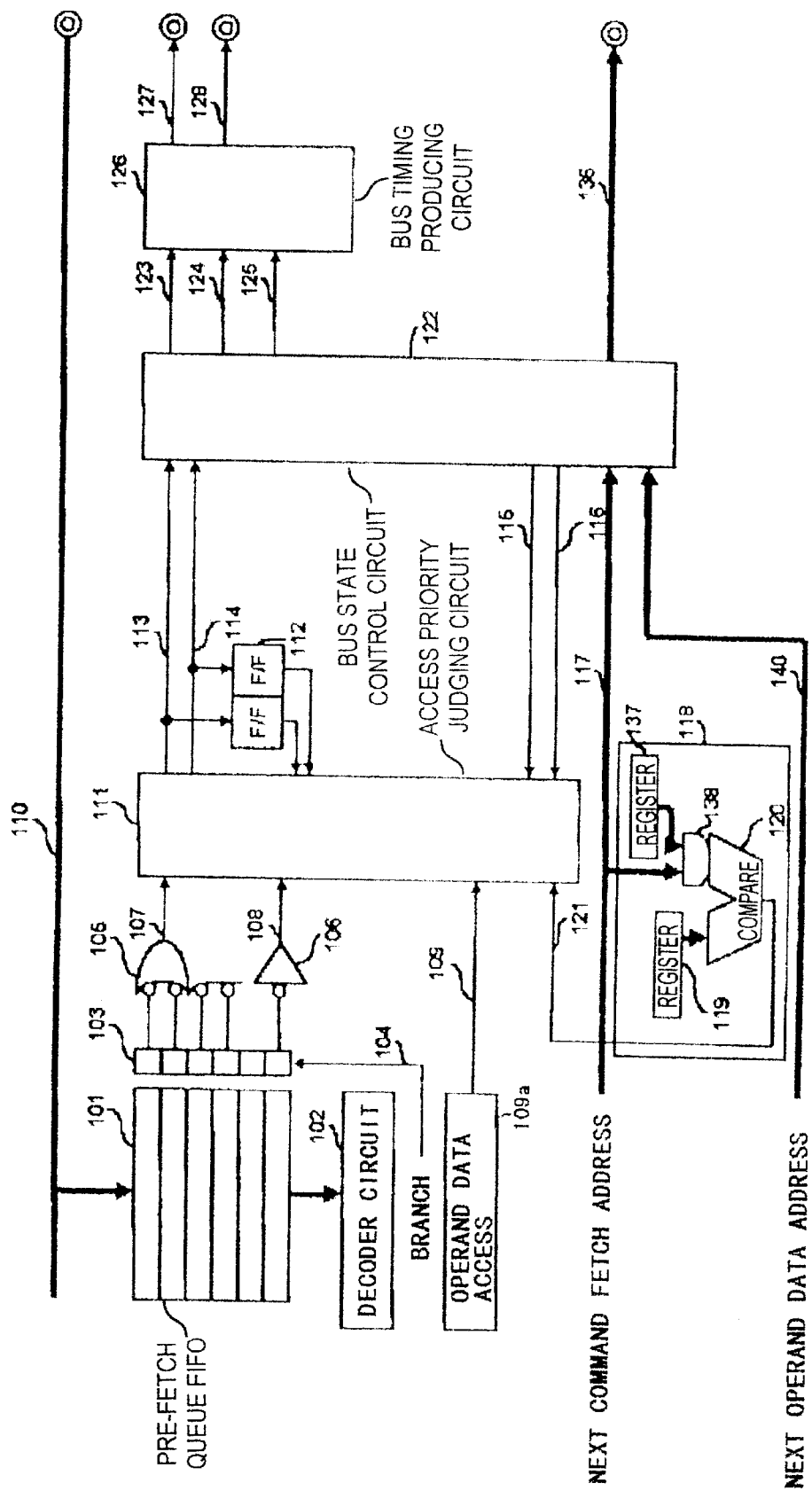
FIG. 7 is a block diagram of a bus interface in accordance with the second embodiment.

As illustrated in FIG. 7, the micro-processor in accordance with the second embodiment is designed to include a comparator 120 and a logical product (AND) gate 138. The comparator 120 compares the next address, namely, a next command fetch address 117 to data indicating a condition at which burst transfer is carried out, stored in advance in a register 119. The next command fetch address 117 is masked with a mask value stored in advance in a command fetch bit mask register 137, and then, transmitted to the comparator 120 through the logical product gate 138.

If an address transmitted from the logical product gate 138 is coincident with a signal transmitted from the register 119 and indicating a condition at which burst transfer is carried out, the comparator 120 generates a burst transfer completion signal 121 indicating that burst transfer is about to finish, and transmits the signal 121 to the access priority judging circuit 111.

The access priority judging circuit 111 activates command fetch access in preference to operand data access when the following conditions are fulfilled: (a) the access register 112 stores command fetch access therein; (b) the pre-fetch request signal 107 and the operand data request signal 109 are generated; and (c) the burst transfer completion signal 121 is not generated in the case that the burst transfer signal 115 is generated.

The access priority judging circuit 111 thereafter carries out operand data access.

In the above-mentioned first embodiment, command fetch access is carried out in preference to operand data access while there is generated the burst transfer signal 115 indicating that a memory is in such a condition that the next address can be carried out in burst transfer (succession of T2 state), when an operand data request 109 is made during carrying out command fetch in burst transfer. In accordance with the second embodiment, command fetch access is carried out in preference to operand data access until the burst transfer signal 115 or the burst transfer completion signal 121 is generated.

A first condition at which the burst transfer completion signal 121 is set such that the first condition is shorter than a second condition at which the burst transfer signal 115 is generated, and the second condition is established by multiplying the first condition by an integer. In particular, when there is employed a memory having a greater maximum number of burst transfer, an interval between generation of the burst transfer signals 115 may become longer. If operand data access is kept waiting to be carried out, in such an interval, performances of the micro-processor might be deteriorated. By setting the first and second conditions in the above-mentioned manner, the number of carrying out burst transfer can be reduced.

Figure 6:
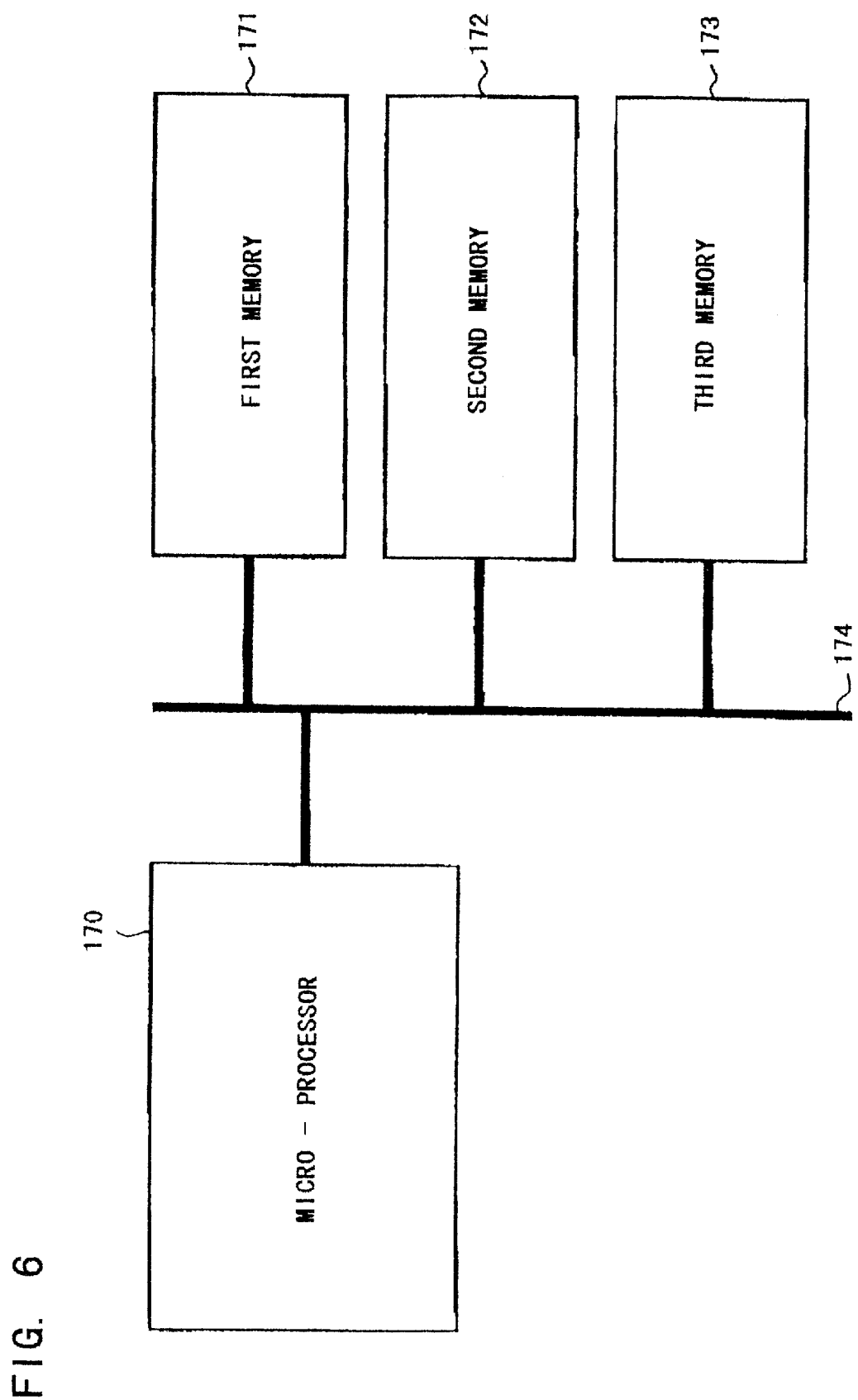
FIG. 6 is a block diagram of a system comprised of a micro-processor and memories, in accordance with the second embodiment of the present invention.

In the second embodiment, the micro-processor and memories are connected to one another in such a manner as illustrated in FIG. 6. That is, the micro-processor 170 is electrically connected to a first memory 171, a second memory 172 and a third memory 173 through a system bus 174. The first memory 171 can carry out burst transfer of addresses by the number of 8 multiplied by a positive integer (8, 16, 24, - - - ), and stores a command code therein. The second memory 172 can carry out burst transfer of addresses by the number of 4 multiplied by a positive integer (4, 8, 12, - - - ), and stores operand data therein. The third memory 173 can carry out burst transfer of addresses by the number of 2 multiplied by a positive integer (2, 4, 6, - - - ), and stores operand data therein.

In the second embodiment, the burst transfer completion signal 121 is designed to be generated under a condition that burst transfer is completed at k-th address wherein k indicates an integer multiplied by 4. A bit "11B" is set in the register 119, and a bit "00000011B" is set in the command fetch bit mask register 137. Thus, lowest 2 bits in an address are effective, and other bits are masked. The next command fetch address 117 is masked by the logic product gate 138. A coincidence condition in comparison carried out by the comparator 120 is an address of (4X−1) wherein X is an integer. This coincidence condition is transmitted to the access priority judging circuit 111 as the condition 121 at which burst transfer is completed.

Hereinbelow is explained an operation of the micro-processor in accordance with the second embodiment.

Figure 8:
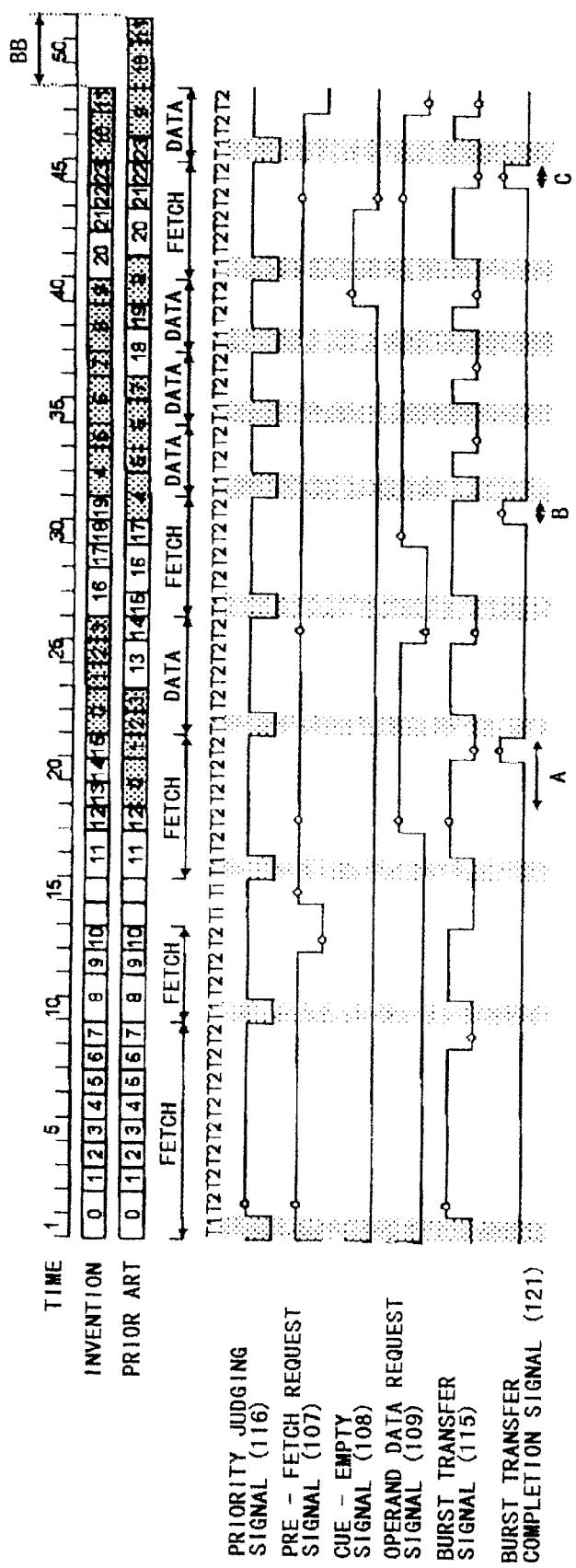
FIG. 8 is a timing chart of the bus interface in accordance with the second embodiment.

With reference to the timing chart of FIG. 8, time 1 to 29 are almost the same as time 1 to 29 in the timing chart of FIG. 5 in the first embodiment, but the burst transfer completion signal 121 is added thereto.

An address 136 at time 1 is designed to be zero.

At time 21, since the lowest two bits of the address 136 are 11B, and those meet boundary conditions of 4X where X is an integer, the burst transfer completion signal 121 is generated. The access priority judging circuit 111 takes the burst transfer completion signal 121 as a condition at which burst transfer of command fetch is completed, and determines to carry out operand data access as the next bus access.

At time 30, the access priority judging circuit 111 determines to carry out burst transfer of command fetch as the next bus access in accordance with Table 1, and keeps an operand data request pending, since the following requirements are all fulfilled: (a) there is generated the operand data request signal 109 as well as the pre-fetch request signal 107; (b) the access register 112 storing data about the previous access stores command fetch access; (c) there is generated the burst transfer signal 115; and (d) the burst transfer completion signal 121 is inactive.

At time 31, though the burst transfer signal 115 continues to be generated, burst transfer of command fetch is completed, since the burst transfer completion signal 121 was generated. The access priority judging circuit 111 determines to carry out operand data access as the next bus access in accordance with Table 1.

During time 32 to 39, operand data access is carried out in preference to command fetch access since the operand data request signal 109 is kept being generated, and the access register 112 stores operand data access therein.

At time 40, the queue empty signal 108 is generated, because operand data access has been successively carried out, and thus, command code in the pre-fetch queue FIFO 101 has become empty. Operand data access is mandatorily interrupted, and command fetch access is determined as the next bus access.

At time 44, the queue empty signal 108 becomes inactive. Similarly to the case of time 30, the access priority judging circuit 111 determines to carry out burst transfer of command fetch as the next bus access in accordance with Table 1, and keeps an operand data request pending to carry out, since the following requirements are all fulfilled: (a) there are generated the operand data request signal 109 and the pre-fetch request signal 107; (b) the access register 112 storing data about the previous access stores command fetch access; (c) there is generated the burst transfer signal 115; and (d) the burst transfer completion signal 121 is inactive.

As having been explained so far, the micro-processor in accordance with the second embodiment keeps the operand data request 109 pending to carry out in waiting periods A, B and C, as shown in the timing chart of FIG. 8. As a result, it is possible to enhance bus interface performance by three states in comparison with prior art, as shown in FIG. 8 with a difference BB in performance between the invention and prior art.

Third Embodiment

Figure 9:
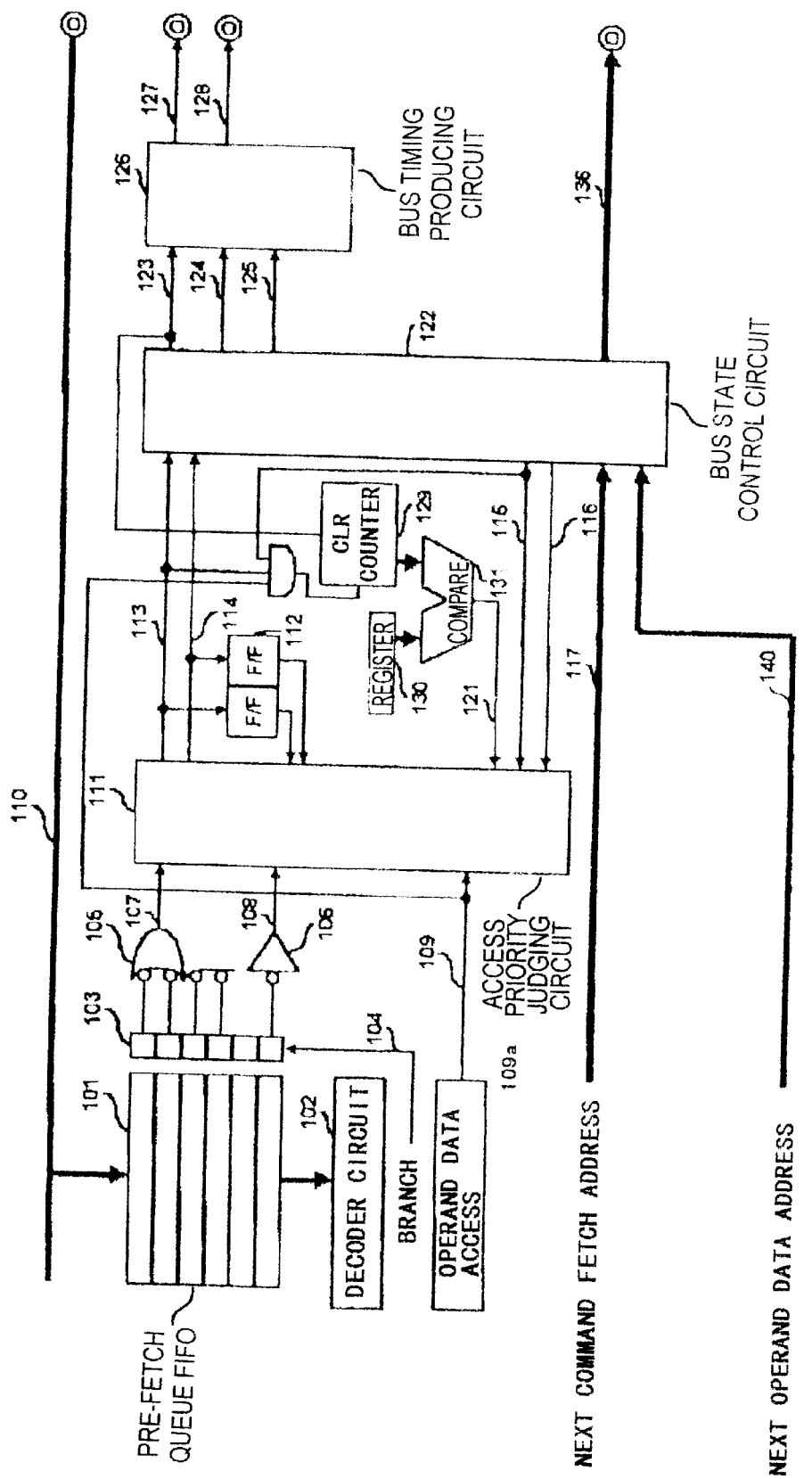
FIG. 9 is a block diagram of a bus interface in accordance with the third embodiment.

A micro-processor in accordance with the third embodiment is explained hereinbelow with reference to FIGS. 3, 9 and 10.

In the third embodiment, when an operand data request 109 is made while burst transfer access of command fetch is being carried out, the burst transfer is interrupted or continued as follows.

The micro-processor in accordance with the third embodiment is designed to further include a first counter 129 which counts the number of burst transfer, a register 130 which stores the number of burst transfer in command fetch, and a comparator 131 which compares the number counted by the first counter 129 to the number stored in the register 130.

The comparator 131 transmits a burst transfer completion signal 121 indicative of the result of comparison carried out by the comparator 131, to the access priority judging circuit 111.

The access priority judging circuit 111 makes judgement as follows.

The access priority judging circuit 111 activates command fetch access in preference to operand data access when the following conditions are fulfilled: (a) the access register 112 stores command fetch access therein; (b) the pre-fetch request signal 107 and the operand data request signal 109 are generated; and (c) the burst transfer completion signal 121 is not generated in the case that the burst transfer signal 115 is generated.

The access priority judging circuit 111 thereafter carries out operand data access.

In the above-mentioned first embodiment, command fetch access is carried out in preference to operand data access while there is generated the burst transfer signal 115 indicating that a memory is in such a condition that the next address can be carried out in burst transfer (succession of T2 state), when an operand data request 109 is made during carrying out command fetch in burst transfer. In accordance with the third embodiment, command fetch access is carried out in preference to operand data access until the burst transfer signal 115 or the burst transfer completion signal 121 is generated.

The micro-processor in accordance with the third embodiment is electrically connected to memories in the same manner as the first embodiment. That is, as illustrated in FIG. 3, the micro-processor is electrically connected to both a first memory and a second memory through a system bus. The first memory can carry out burst transfer of addresses by the number of 8 multiplied by a positive integer (8, 16, 24, - - - ), and stores a command code therein. The second memory 162 can carry out burst transfer of addresses by the number of 4 multiplied by a positive integer (4, 8, 12, - - - ), and stores operand data therein.

Hereinbelow is explained a structure of a bus interface of the micro-processor in accordance with the third embodiment, with reference to FIG. 9. Parts or elements that correspond to those of the conventional micro-processor illustrated in FIG. 1 have been provided with the same reference numerals, and are not explained hereinbelow.

The burst transfer completion signal 121 is generated under the following conditions. First, the number by which an operand data request is to be carried out in preference to a pre-fetch request is in advance stored in the register 130. The first counter 129 is counted up when the command fetch access signal 113, the operand data request signal 109, and the burst transfer signal 115 are all active. When the count in the first counter 129 becomes equal to the number stored in the register 130, the burst transfer completion signal 121 is generated.

That is, a maximum state number in waiting time is in advance stored in the register 130. Herein, there is explained an example where the maximum state number is equal to 2.

Hereinbelow is explained an operation of the micro-processor in accordance with the third embodiment, with reference to FIG. 10.

At time 2, burst transfer of command fetch access starts being carried out.

At time 3, an operand data request signal 109 is generated. The first counter 129 is counted up, since the command fetch access signal 113, the operand data request signal 109 and the burst transfer signal 115 are all active. Hence, the first counter 129 counts one (1). An operand data access request is pending to be carried out.

At time 4, the first counter 129 is also counted up, resulting in that the first counter 129 counts two (2). Thus, the comparator 131 detects coincidence. Accordingly, the burst transfer completion signal 121 is generated at the next timing.

At time 5, since the burst transfer completion signal 121 has been generated, burst transfer of command fetch is completed. The access priority judging circuit 111 determines to carry out an operand data access as the next bus access.

At time 17, since the burst transfer signal 115 is not active, the access priority judging circuit 111 determines to carry out an operand data access as the next bus access.

Figure 10:
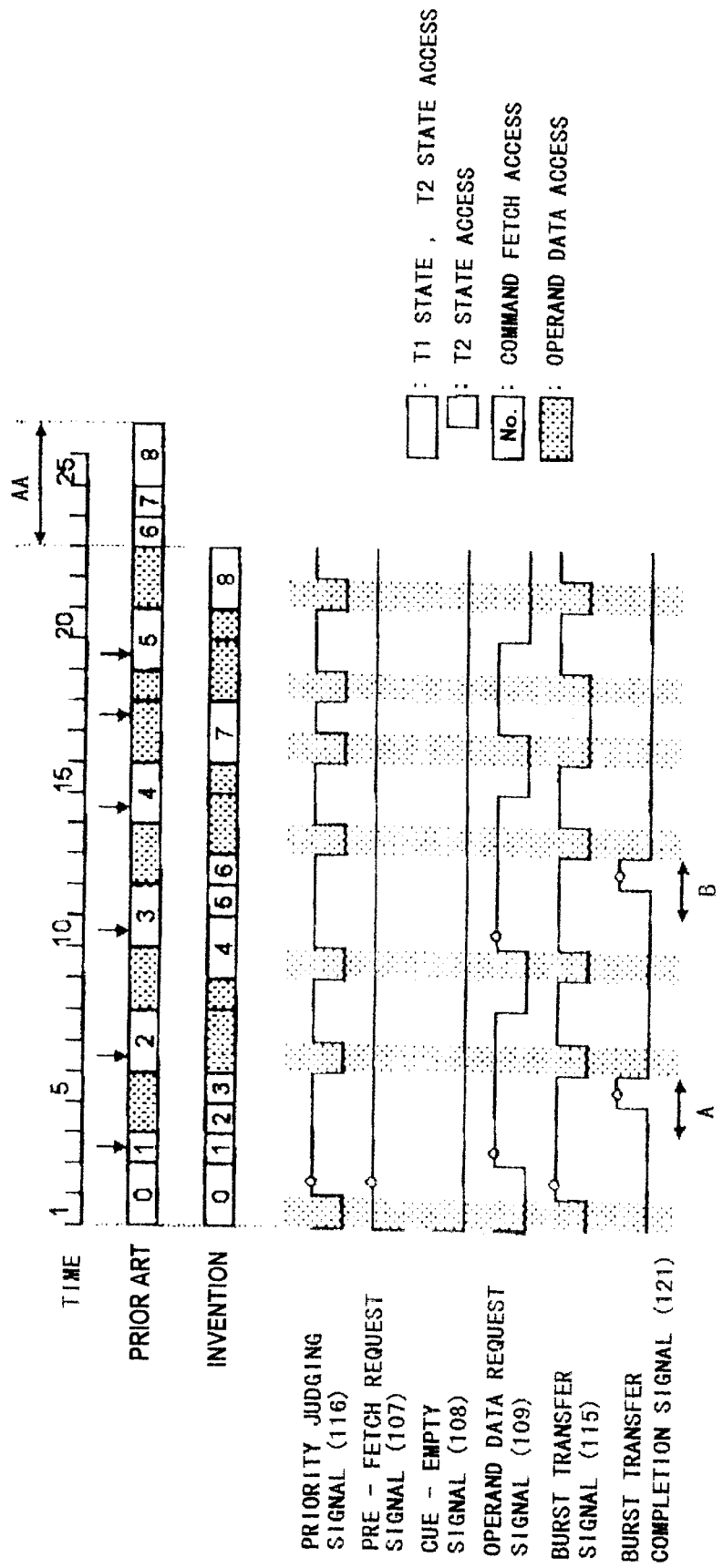
FIG. 10 is a timing chart of the bus interface in accordance with the third embodiment.

As having been explained so far, the micro-processor in accordance with the third embodiment keeps the operand data request 109 pending to carry out in waiting periods A and B, as shown in the timing chart of FIG. 10, to thereby carry out burst transfer of command fetch in preference to an operand data access. As a result, it is possible to enhance bus interface performance by four states in comparison with prior art, as shown in FIG. 10 with a difference AA in performance between the invention and prior art. Herein, the waiting periods A and B are equal to each other.

If the burst transfer signal 115 becomes inactive during waiting period, an operand data access having been kept pending to carry out is carried out at once.

Fourth Embodiment

Figure 11:
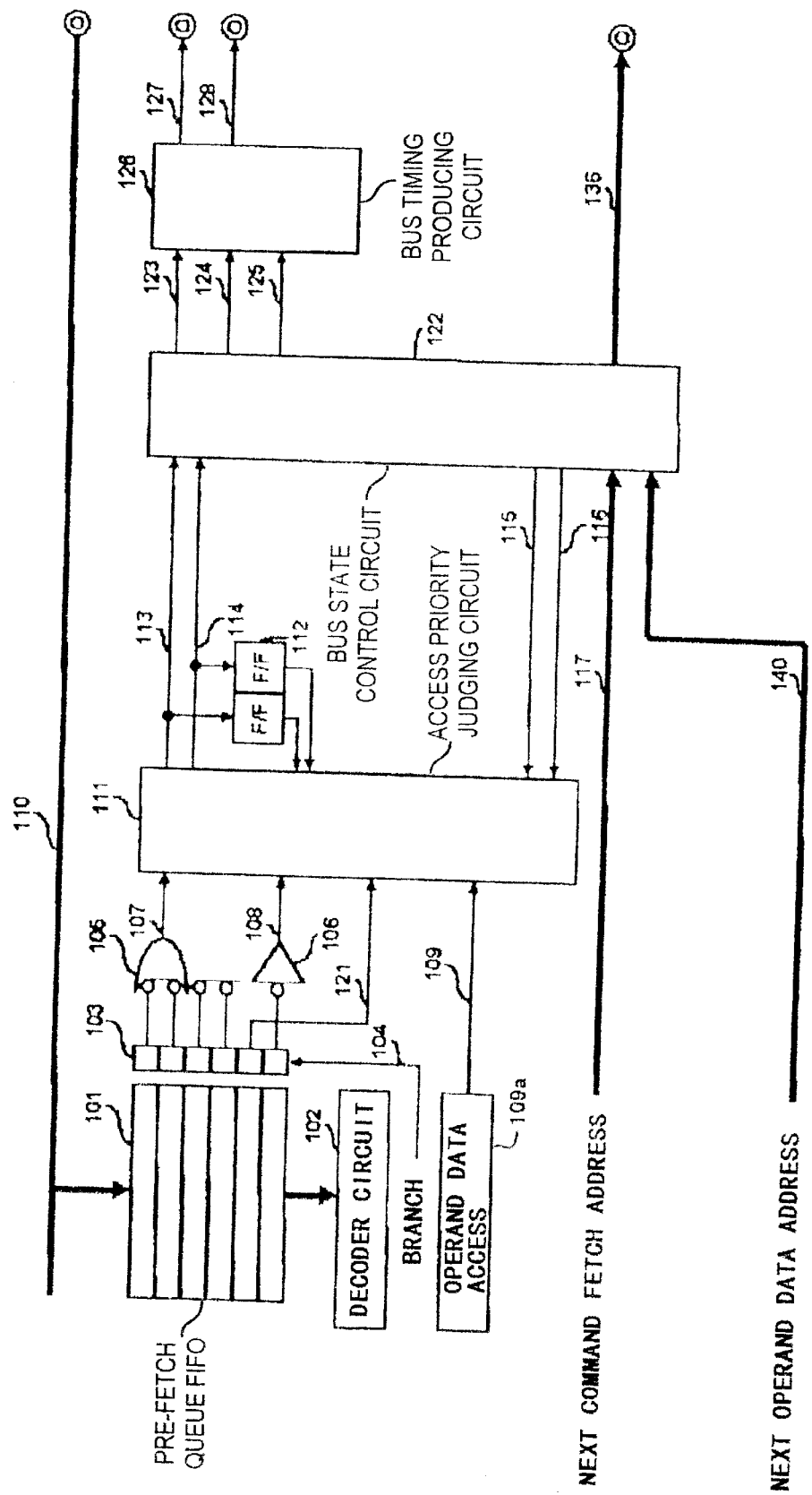
FIG. 11 is a block diagram of a bus interface in accordance with the fourth embodiment.

A micro-processor in accordance with the fourth embodiment is explained hereinbelow with reference to FIGS. 3, 11 and 12.

In the fourth embodiment, when an operand data request 109 is made while burst transfer access of command fetch is being carried out, the burst transfer is interrupted or continued as follows.

In the fourth embodiment, the pre-fetch cue valid 103 transmits the burst transfer completion signal 121 to the access priority judging circuit 111. The burst transfer completion signal 121 indicates that an amount of command code in the pre-fetch cue FIFO 101 is smaller than a predetermined amount.

The access priority judging circuit 111 makes judgement as follows.

The access priority judging circuit 111 activates command fetch access in preference to operand data access when the following conditions are fulfilled: (a) the access register 112 stores command fetch access therein; (b) the pre-fetch request signal 107 and the operand data request signal 109 are generated; and (c) the burst transfer completion signal 121 is not generated in the case that the burst transfer signal 115 is generated.

The access priority judging circuit 111 thereafter carries out operand data access.

In the above-mentioned first embodiment, command fetch access is carried out in preference to operand data access while there is generated the burst transfer signal 115 indicating that a memory is in such a condition that the next address can be carried out in burst transfer (succession of T2 state), when an operand data request 109 is made during carrying out command fetch in burst transfer. In accordance with the fourth embodiment, command fetch access is carried out in preference to operand data access until the burst transfer signal 115 or the burst transfer completion signal 121 is generated.

The micro-processor in accordance with the fourth embodiment is electrically connected to memories in the same manner as the first embodiment. That is, as illustrated in FIG. 3, the micro-processor is electrically connected to both a first memory and a second memory through a system bus. The first memory can carry out burst transfer of addresses by the number of 8 multiplied by a positive integer (8, 16, 24, - - - ), and stores a command code therein. The second memory 162 can carry out burst transfer of addresses by the number of 4 multiplied by a positive integer (4, 8, 12, - - - ), and stores operand data therein.

Hereinbelow is explained a structure of a bus interface of the micro-processor in accordance with the fourth embodiment, with reference to FIG. 11. Parts or elements that correspond to those of the conventional micro-processor illustrated in FIG. 1 have been provided with the same reference numerals, and are not explained hereinbelow.

The burst transfer completion signal 121 is generated in dependence on a flag of the pre-fetch queue valid 103 in a certain stage of the pre-fetch queue FIFO 101. When the pre-fetch queue valid 103 includes an effective command code, the burst transfer completion signal is made active. If an operand data request is made while burst transfer of command fetch is being carried out, operand data access is carried out after a command code has been stored in the pre-fetch queue FIFO 101 in a certain amount.

In the fourth embodiment, the burst transfer completion signal 121 is connected to the second stage of the pre-fetch queue valid 103 in the pre-fetch queue FIFO 101.

The pre-fetch queue FIFO 101 transfers a command code without processing, if a decoder circuit is empty. The decoder circuit processes one command in two states.

Hereinbelow is explained an operation of the micro-processor in accordance with the fourth embodiment, with reference to FIG. 12.

At time 2, burst transfer of command fetch access starts being carried out.

At time 3, an operand data request signal 109 is generated. An operand data request is kept pending to carry out, because the burst transfer completion signal 121 is not generated, that is, a command code is not stored in the second stage in pre-fetch cue FIFO 101.

At time 5, since a command code is stored in the second stage in the pre-fetch cue FIFO 101, the burst transfer completion signal 121 is generated, and thus, burst transfer of command fetch is completed. Then, the access priority judging circuit 111 determines to carry out operand data access as the next bus access.

At time 13, since the burst transfer signal 115 becomes inactive before the burst transfer completion signal 121 is generated, burst transfer of command fetch is completed. The access priority judging circuit 111 determines to carry out operand data access as the next bus access.

Figure 12:
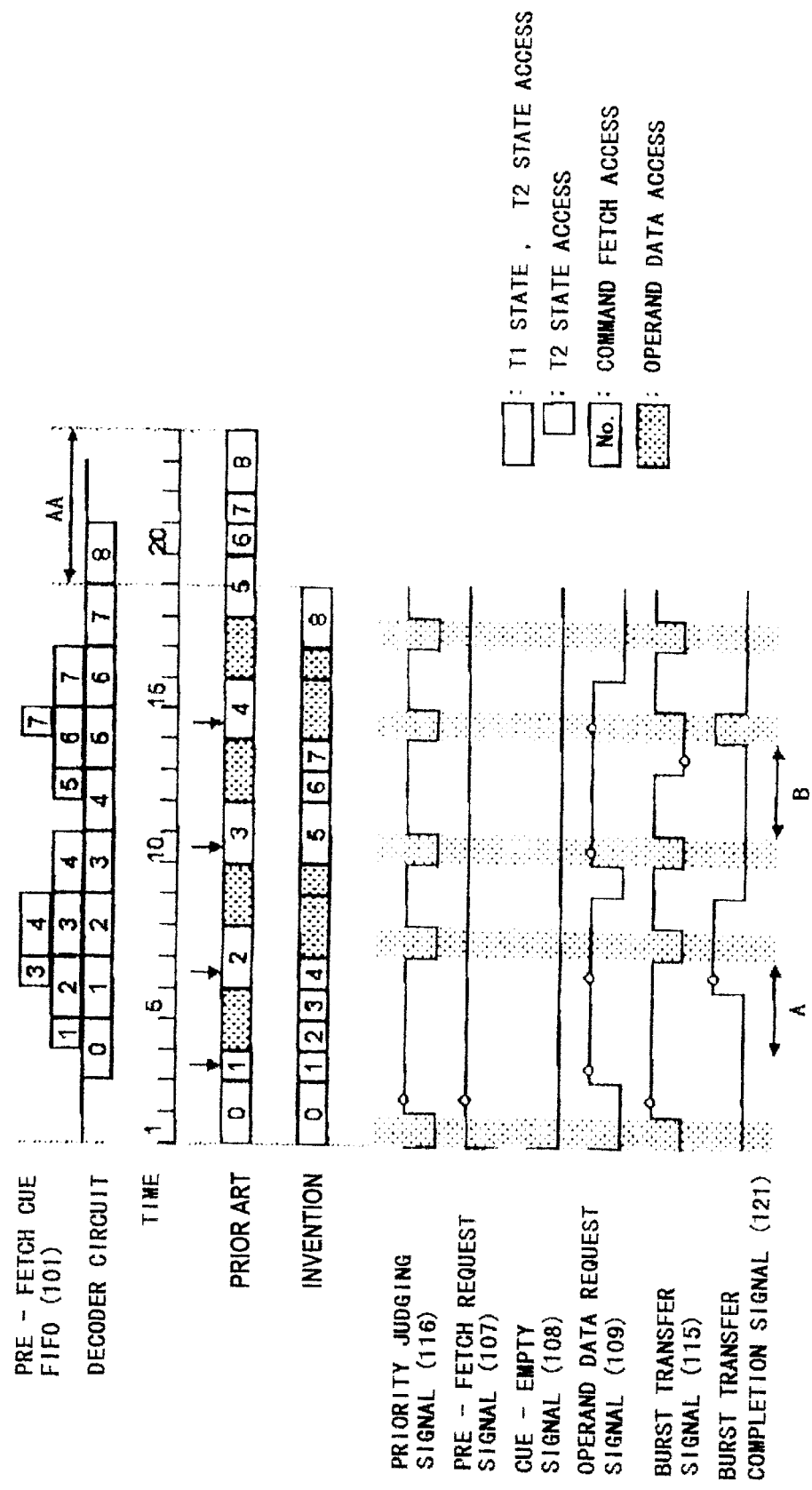
FIG. 12 is a timing chart of the bus interface in accordance with the fourth embodiment.

As having been explained so far, the micro-processor in accordance with the fourth embodiment keeps the operand data request 109 pending to carry out in waiting periods A and B, as shown in the timing chart of FIG. 12, to thereby carry out burst transfer of command fetch in preference to an operand data access. As a result, it is possible to enhance bus interface performance by five states in comparison with prior art, as shown in FIG. 12 with a difference AA in performance between the invention and prior art.

Fifth Embodiment

A micro-processor in accordance with the fifth embodiment is explained hereinbelow with reference to FIGS. 3, 13 and 14.

In the fifth embodiment, the highest priority of bus interface is assigned to the cue empty signal 108, the second highest priority is assigned to the operand data request signal 109, and the lowest priority is assigned to the command fetch request signal 107. When the cue empty signal 108 is generated while burst transfer access of operand data access is being carried out, the burst transfer is interrupted or continued as follows.

Figure 13:
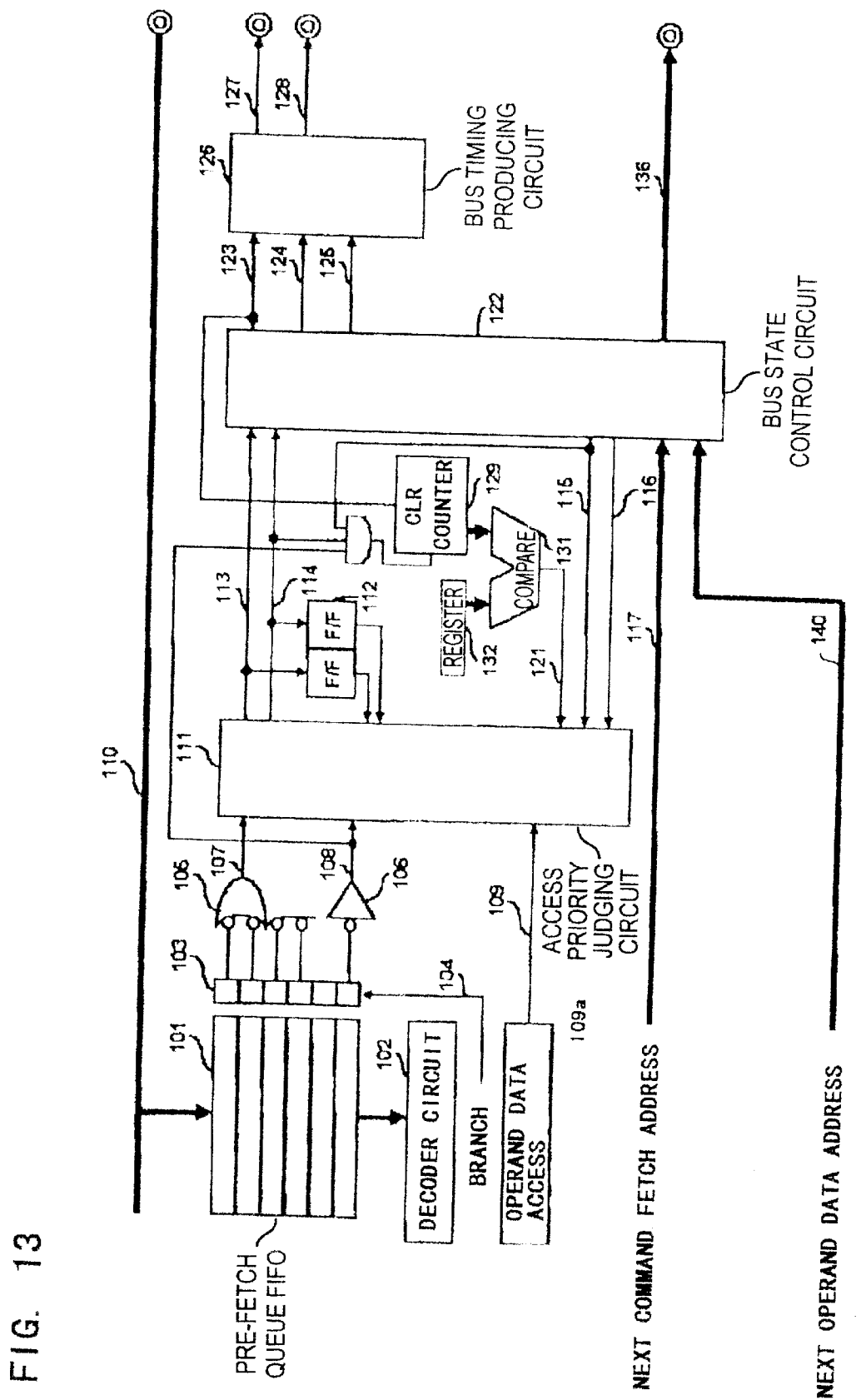
FIG. 13 is a block diagram of a bus interface in accordance with the fifth embodiment.

As illustrated in FIG. 13, the micro-processor in accordance with the fifth embodiment is designed to further include a first counter 129 which counts the number of burst transfer, a register 132 which stores the number of burst transfer in operand data access, and a comparator 131 which compares the number counted by the first counter 129 to the number stored in the register 132. The comparator 131 transmits a burst transfer completion signal 121 indicative of the result of comparison carried out by the comparator 131, to the access priority judging circuit 111.

The access priority judging circuit 111 makes judgement as follows.

The access priority judging circuit 111 activates operand data access in preference to command fetch access when the following conditions are fulfilled: (a) the access register 112 stores operand data access therein; (b) the cue empty signal 108 and the operand data request signal 109 are generated; and (c) the burst transfer completion signal 121 is not generated in the case that the burst transfer signal 115 is generated.

The access priority judging circuit 111 thereafter carries out command fetch access.

In the conventional micro-processor, when the cue empty signal 108 is generated while operand data access is carried out in burst transfer, command fetch access is carried out as the next bus access in preference to operand data access. In accordance with the fifth embodiment, command fetch access is carried out in preference to operand data access when the burst transfer signal 115 indicating that a memory is in such a condition that the next access can be carried out in burst transfer (succession of T2 state) is generated, and when the burst transfer completion signal 121 is also generated.

The micro-processor in accordance with the fifth embodiment is electrically connected to memories in the same manner as the first embodiment. That is, as illustrated in FIG. 3, the micro-processor is electrically connected to both a first memory and a second memory through a system bus. The first memory can carry out burst transfer of addresses by the number of 8 multiplied by a positive integer (8, 16, 24, - - - ), and stores a command code therein. The second memory 162 can carry out burst transfer of addresses by the number of 4 multiplied by a positive integer (4, 8, 12, - - - ), and stores operand data therein.

In the fifth embodiment, the register 132 is designed to store two states.

Hereinbelow is explained a structure of a bus interface of the micro-processor in accordance with the fifth embodiment, with reference to FIG. 13. Parts or elements that correspond to those of the conventional micro-processor illustrated in FIG. 1 have been provided with the same reference numerals, and are not explained hereinbelow.

The burst transfer completion signal 121 is generated as follows. First, the number by which an operand data request is to be carried out in preference to a pre-fetch request is in advance stored in the register 132. The first counter 129 is counted up when the operand data access signal 114, the cue empty signal 108, and the burst transfer signal 115 are all active. When the count in the first counter 129 becomes equal to the number stored in the register 132, the burst transfer completion signal 121 is generated. That is, a maximum state number of waiting period is in advance stored in the register 132.

Hereinbelow is explained an operation of the micro-processor in accordance with the fifth embodiment.

Figure 14:
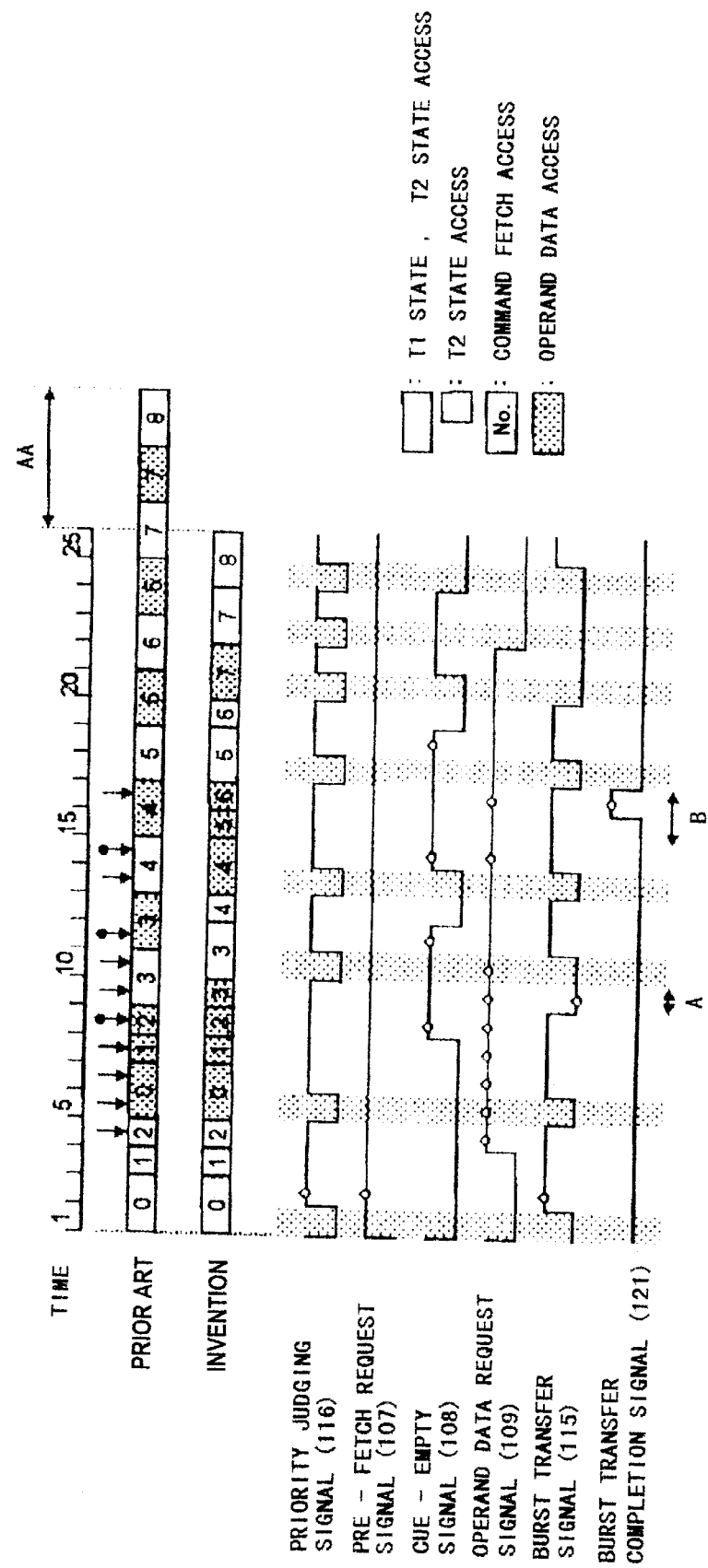
FIG. 14 is a timing chart of the bus interface in accordance with the fifth embodiment.

With reference to FIG. 14, at time 1, command fetch starts.

As from time 5, operand data access is carried out in burst transfer.

At time 8, the cue empty signal 108 is generated. Since the operand data access signal 114, the cue empty signal 108, and the burst transfer signal 115 are all active, the first counter 129 is counted up. Thus, the first counter 129 counts one (1). A command fetch request is kept pending to carry out.

At time 9, since the burst transfer signal 115 becomes inactive, burst transfer of operand data access is ended. The access priority judging circuit 111 determines to carry out command fetch access as the next bus access.

At time 14, the first counter 129 is counted up, since the cue empty signal 108 is generated, and the operand data access signal 114, the cue empty signal 108 and the burst transfer signal 115 are all active. Thus, the first counter 129 counts one (1). A command fetch request is kept pending to carry out.

At time 15, since the condition at time 15 is the same as the condition at time 14, the first counter 129 is counted up. Thus, the first counter counts two (2), and hence, the comparator 131 detects coincidence. Accordingly, the burst transfer completion signal 121 is generated at the next timing.

At time 16, burst transfer of command fetch is ceased, because the burst transfer completion signal 121 has been generated. The access priority judging circuit 111 determines to carry out command fetch access as the next bus access.

As having been explained so far, the micro-processor in accordance with the fifth embodiment keeps the cue empty request 108 pending to carry out in waiting periods A and B, as shown in the timing chart of FIG. 14, to thereby carry out burst transfer of operand data access in preference to command fetch access. As a result, it is possible to enhance bus interface performance by five states in comparison with prior art, as shown in FIG. 14 with a difference AA in performance between the invention and prior art.

If the burst transfer signal 115 becomes inactive during waiting period, command fetch access having been kept pending to carry out is carried out at once.

In the fifth embodiment, priority may be change in dependence on the number of requests of operand data access.

Sixth Embodiment

A micro-processor in accordance with the sixth embodiment is explained hereinbelow with reference to FIGS. 15–17.

In the sixth embodiment, the highest priority of bus interface is assigned to the cue empty signal 108, the second highest priority is assigned to the operand data request signal 109, and the lowest priority is assigned to the command fetch request signal 107. When the cue empty signal 108 is generated while burst transfer access of operand data access is being carried out, the burst transfer is interrupted or continued as follows.

A comparator 135 compares an address masked by the logic product gate 138 in an operand data bit mask register 139, to a condition for carrying out burst transfer, stored in a register 134. The operand data bit mask register 139 stores therein a next operand data address 140 as the next address. When they are coincident with each other, the comparator 135 transmits a burst transfer completion signal 121 indicating that burst transfer reaches its boundary.

The access priority judging circuit 111 makes judgement as follows.

The access priority judging circuit 111 activates operand data access in preference to command fetch access when the following conditions are fulfilled: (a) the access register 112 stores operand data access therein; (b) the cue empty signal 108 and the operand data request signal 109 are generated; and (c) the burst transfer completion signal 121 is not generated in the case that the burst transfer signal 115 is generated.

The access priority judging circuit 111 thereafter carries out command fetch access.

In the conventional micro-processor, when the cue empty signal 108 is generated while operand data access is carried out in burst transfer, command fetch access is carried out as the next bus access in preference to operand data access. In accordance with the sixth embodiment, command fetch access is carried out in preference to operand data access when the burst transfer signal 115 indicating that a memory is in such a condition that the next access can be carried out in burst transfer (succession of T2 state) is generated, and when the burst transfer completion signal 121 is also generated.

A first condition at which the burst transfer completion signal 121 is set such that the first condition is shorter than a second condition at which the burst transfer signal 115 is generated, and the second condition is established by multiplying the first condition by an integer. In particular, when there is employed a memory having a greater maximum number of burst transfer, an interval between generation of the burst transfer signals 115 may become longer. If command fetch access is kept pending to be carried out, in such an interval, performances of the micro-processor might be deteriorated. By setting the first and second conditions in the above-mentioned manner, the number of carrying out burst transfer can be reduced.

Figure 15:
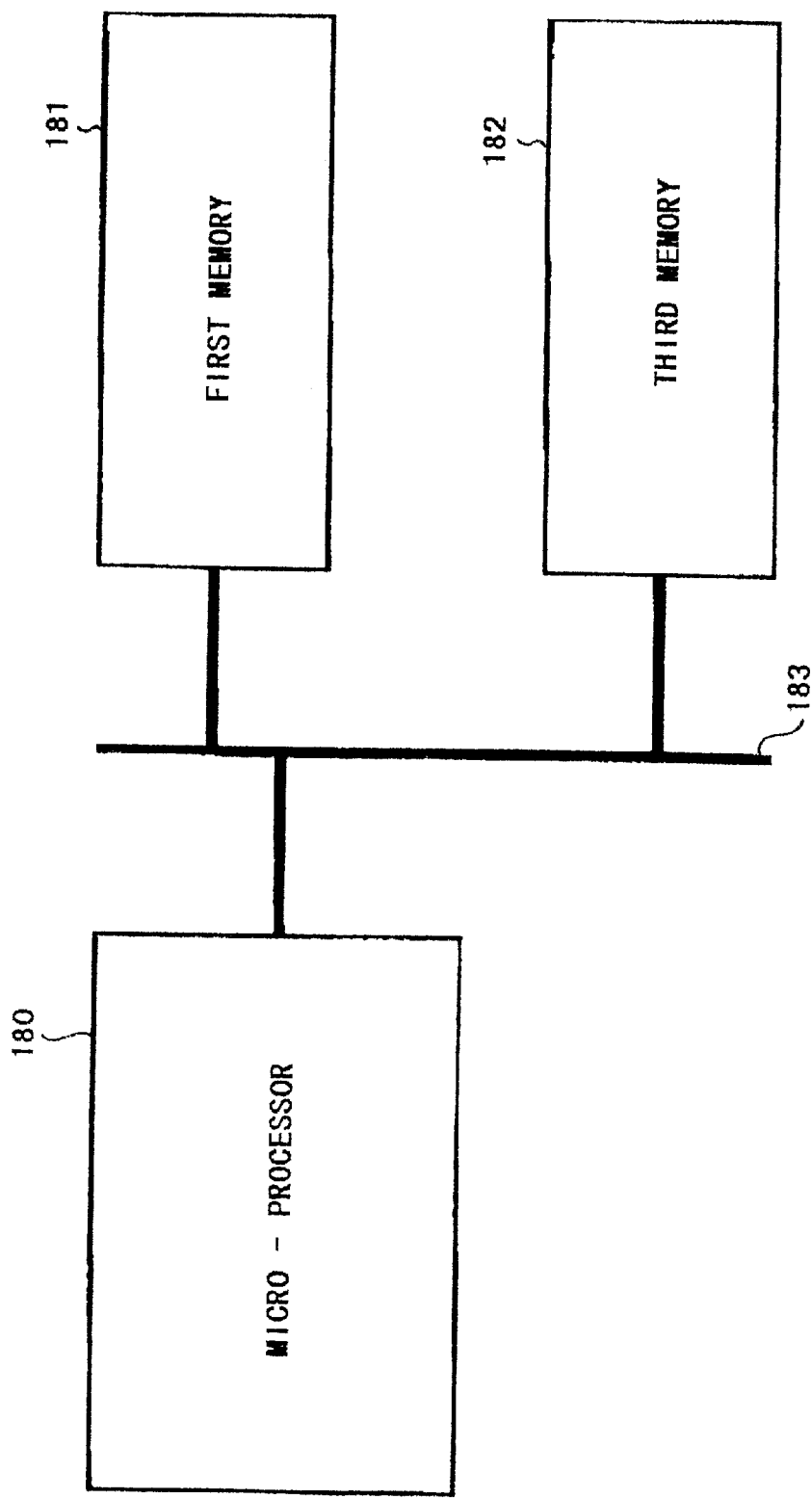
FIG. 15 is a block diagram of a system comprised of a micro-processor and memories, in accordance with the sixth embodiment of the present invention.
Figure 16:
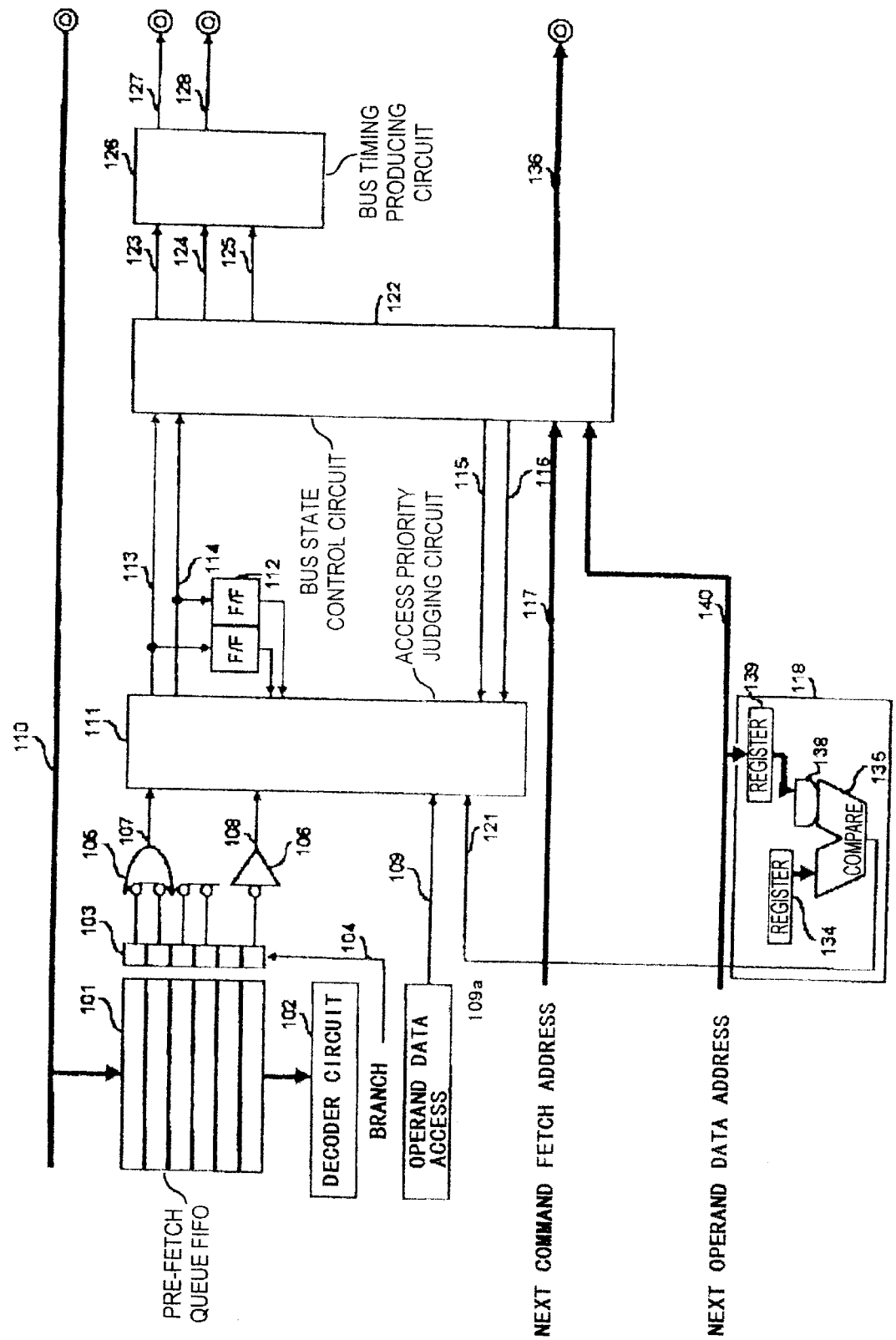
FIG. 16 is a block diagram of a bus interface in accordance with the sixth embodiment.

The micro-processor in accordance with the sixth embodiment is electrically connected to memories in such a manner as illustrated in FIG. 15. The micro-processor 180 is electrically connected to both a first memory 181 and a third memory 182 through a system bus 183. The first memory 181 can carry out burst transfer of addresses by the number of 8 multiplied by a positive integer (8, 16, 24, - - - ), and stores a command code therein. The third memory 182 can carry out burst transfer of addresses by the number of 8 multiplied by a positive integer (8, 16, 24, --), and stores a command code therein.

Hereinbelow is explained a structure of a bus interface of the micro-processor in accordance with the sixth embodiment, with reference to FIG. 16. Parts or elements that correspond to those of the conventional micro-processor illustrated in FIG. 1 have been provided with the same reference numerals, and are not explained hereinbelow.

The burst transfer completion signal 121 is generated as follows. In the sixth embodiment, it is assumed that burst transfer is finished at a k-th address wherein k is an integer multiplied by 4.

A bit "11B" is stored in the register 134, and a bit "00000011B" is set in the operand data bit mask register 139. Thus, lowest 2 bits in an address are effective, and other bits are masked. The next operand data address 140 is masked by the logic product gate 138. A coincidence condition in comparison carried out by the comparator 120 is an address of (4X−1) wherein X is an integer. This coincidence condition is transmitted to the access priority judging circuit 111 as the condition 121 at which burst transfer is completed.

Hereinbelow is explained an operation of the micro-processor in accordance with the sixth embodiment.

Figure 17:
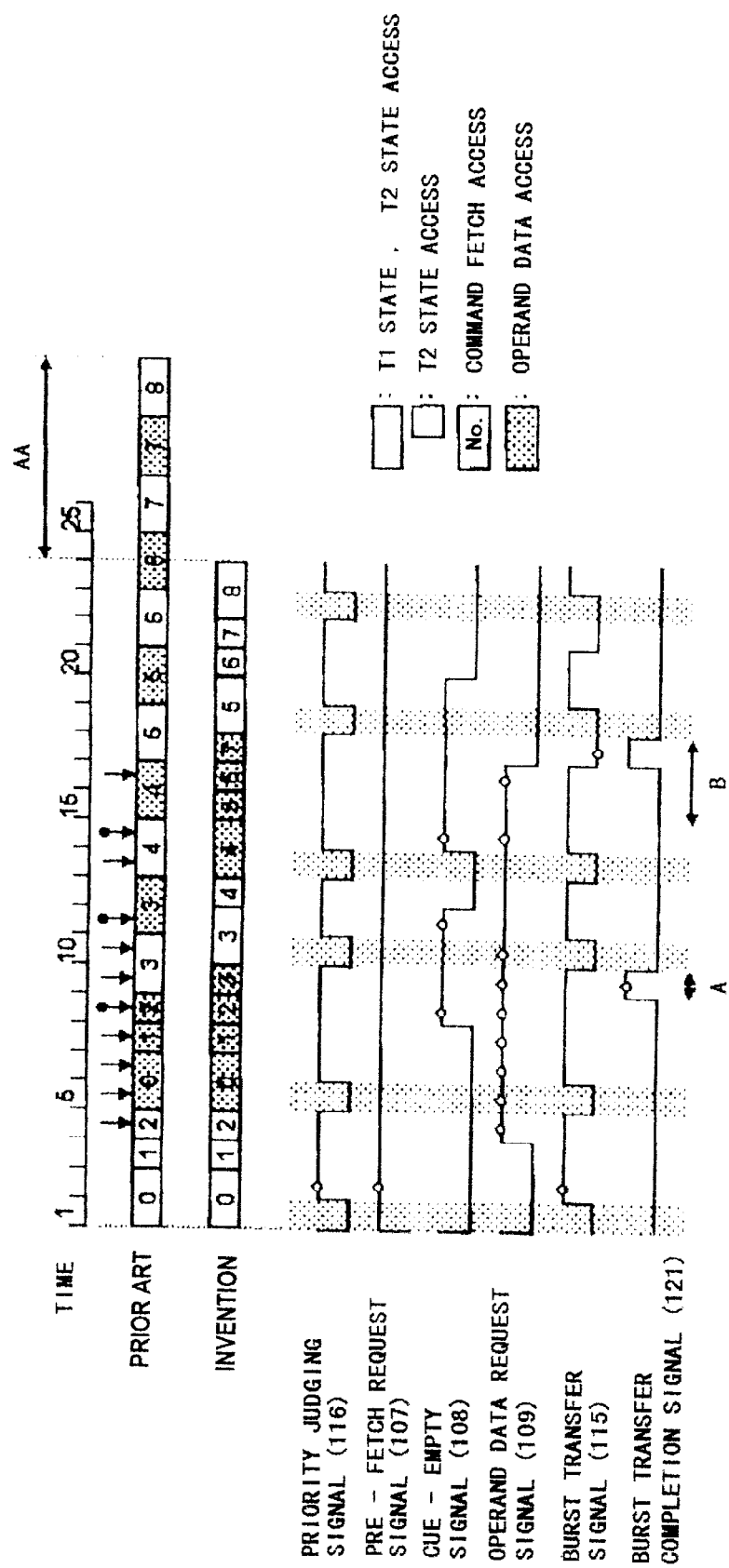
FIG. 17 is a timing chart of the bus interface in accordance with the sixth embodiment.

With reference to FIG. 17, at time 1, command fetch starts.

At time 5, burst transfer of operand data access starts to be carried out. It is assumed that an address 136 at time 5 is zero (0).

At time 8, the cue empty signal 108 is generated. Since the cue empty signal 108, the operand data request signal 109 and the burst transfer signal 115 are all active, and the burst transfer completion signal 121 is inactive, an operand data request is carried out in preference to a command fetch request.

At time 14, similarly to time 8, the cue empty signal 108 is generated. Since the cue empty signal 108, the operand data request signal 109 and the burst transfer signal 115 are all active, and the burst transfer completion signal 121 is inactive, an operand data request is carried out in preference to a command fetch request.

At time 17, the burst transfer signal 115 is turned inactive. Hence, burst transfer of operand data access is finished. The access priority judging circuit 111 determines to carry out command fetch access as the next bus access.

As having been explained so far, the micro-processor in accordance with the sixth embodiment keeps the operand data request 109 pending to carry out in waiting periods A and B, as shown in the timing chart of FIG. 17, to thereby carry out burst transfer of command fetch access in preference to operand data access. As a result, it is possible to enhance bus interface performance by three states in comparison with prior art, as shown in FIG. 17 with a difference BB in performance between the invention and prior art.

As an alternative, the cue empty request signal 108 may be kept pending to be carried out in waiting periods A and B to thereby carry out burst transfer of operand data access in preference to burst transfer of command fetch access. This ensures to enhance bus interface performance by seven states in comparison with prior art, as shown in FIG. 17 with a difference AA in performance between the invention and prior art.

In the sixth embodiment, priority may be change in dependence on the number of requests of operand data access.

In accordance with the above-mentioned first to fourth embodiments, it is possible to avoid mandatory interruption of burst transfer due to the operand data request 109 while command fetch access is being carried out in burst transfer. Operand data access is carried out after command fetch access has been carried out until merits brought by high-speed transfer in burst transfer can be obtained. Thus, it is possible to enhance a capability of data transfer in a bus interface.

In accordance with fifth and sixth embodiments, it is possible to avoid mandatory interruption of burst transfer due to the cue empty signal 108 while operand data access is being carried out in burst transfer. Command fetch access is carried out after operand data access has been carried out until merits brought by high-speed transfer in burst transfer can be obtained. Thus, it is possible to enhance a capability of data transfer in a bus interface.

As having been explained so far, in accordance with the present invention, priority of bus access is judged based on the previous bus access, a condition for carrying out the next access in burst transfer (succession of T2 state), and the number by which burst transfer is carried out.

Specifically, burst transfer of command fetch access is not interrupted while it is being carried out, even if a request of operand data access which has a higher priority than that of command fetch access is made. Thus, the present invention makes it possible to enhance data transfer capability in a bus interface in a micro-processor, since interruption in burst transfer is prevented, and overhead in T1 state when burst transfer is restarted is minimized.

Similarly, burst transfer of operand data access is not interrupted while it is being carried out, even if a request of pre-fetch cue which has a higher priority than that of operand data access is made. Thus, the present invention makes it possible to enhance data transfer capability in a bus interface in a micro-processor, since interruption in burst transfer is prevented, and overhead in T1 state when burst transfer is restarted is minimized.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-339626 filed on November 30, 1998 including specification, claims, drawings and summary is incorporated herein by reference in its entirety.

What is claimed is:

1. A micro-processor comprising:
    (a) a pre-fetch queue FIFO which fetches and stores therein a command code;
    (b) a pre-fetch queue valid indicating that an effective command code is stored in said pre-fetch queue FIFO;
    (c) an access priority judging circuit receiving a pre-fetch request signal indicating that there is vacancy in said pre-fetch queue FIFO, a queue empty signal indicating that said pre-fetch queue FIFO is entirely empty, and an operand data request signal indicating that there has been generated an operand data access, and determining a kind of next bus access;
    (d) a bus state control circuit transmitting a bus interface signal, based on said kind of next bus access having been determined by said access priority judging circuit, and also transmitting a burst transfer signal indicating that a memory is in a condition for carrying out burst transfer; and
    (e) an access register storing data about the previous bus access, said access priority judging circuit taking a command fetch access in preference to an operand data access in the next bus access when data stored in said access register is a command fetch access, and said pre-fetch request signal, said operand data request signal, and said burst transfer signal are all transmitted.

2. The micro-processor as set forth in claim 1, further comprising:
    (f) a first register storing a condition at which burst transfer of a command fetch is completed; and (g) a first comparator receiving the next command fetch address and said condition transmitted from said first register to thereby detect a boundary condition of a memory, and transmitting a first signal indicating that burst transfer should be completed, as a result of detecting said boundary condition, said access priority judging circuit making judgement as to whether a command fetch access should be taken preference over an operand data access in the next bus access in accordance with said first signal, when data stored in said access register is a command fetch access, and said pre-fetch request signal, said operand data request signal, and said burst transfer signal are all transmitted.

3. The micro-processor as set forth in claim 1, further comprising:

(h) a first counter counting the number of burst transfer;

(i) a second register storing the number of burst transfer in a command fetch; and (j) a second comparator comparing said number of burst transfer counted by said first counter to said number of burst transfer stored in said second register, and transmitting a second signal indicating that burst transfer should be completed, as a result of comparison, said access priority judging circuit making judgement as to whether a command fetch access should be taken preference over an operand data access in the next bus access in accordance with said second signal, when data stored in said access register is a command fetch access, and said pre-fetch request signal, said operand data request signal, and said burst transfer signal are all transmitted.

4. The micro-processor as set forth in claim 1, further comprising:

(k) a detector detecting that a command code in said pre-fetch queue FIFO is smaller than a predetermined amount, on the basis of said pre-fetch queue valid, and transmitting a third signal indicating that burst transfer should be completed, as a result of detection, said access priority judging circuit making judgement as to whether a command fetch access should be taken preference over an operand data access in the next bus access in accordance with said third signal, when data stored in said access register is a command fetch access, and said pre-fetch request signal, said operand data request signal, and said burst transfer signal are all transmitted.

5. The micro-processor as set forth in claim 1, further comprising:

(l) a second counter counting the number of burst transfer;

(m) a third register storing the number of burst transfer in operand data access; and (n) a third comparator comparing said number of burst transfer counted by said second counter to said number of burst transfer stored in said third register, and transmitting a fourth signal indicating that burst transfer should be completed, as a result of comparison, said access priority judging circuit giving first priority to said queue empty signal, second priority to said operand data request signal, and third priority to said pre-fetch request signal, respectively, said access priority judging circuit making judgement as to whether an operand data access should be taken preference over a command fetch access in the next bus access in accordance with said fourth signal, when data stored in said access register is an operand data access, and said queue empty signal, said operand data request signal, and said burst transfer signal are all transmitted.

6. The micro-processor as set forth in claim 1, further comprising:

(o) a fourth register storing a condition at which burst transfer in operand data is completed; and (p) a fourth comparator receiving the next operand data address and said condition transmitted from said fourth register to thereby detect a boundary condition of a memory, and transmitting a fifth signal indicating that burst transfer should be completed, as a result of detecting said boundary condition, said access priority judging circuit giving first priority to said queue empty signal, second priority to said operand data request signal, and third priority to said pre-fetch request signal, respectively, said access priority judging circuit making judgement that the next bus address is operand data access in accordance with said fifth signal, when data stored in said access register is an operand data access, and said queue empty signal, said operand data request signal, and said burst transfer signal are all transmitted.

7. A micro-processor comprising:

(a) a bus interface in which a request of operand data is given a higher priority than a request of command fetch;

(b) an access register storing data about the previous access, said micro-processor, if a request of operand data is made while burst transfer access for command fetch is being carried out, determining whether burst transfer should be interrupted or continued, based on data stored in said access register, wherein said micro-processor takes command fetch in preference to over operand data access, while a first signal is being transmitted which first signal indicates that a memory is put in such a condition that burst transfer of the next access can be carried out.

8. A micro-processor comprising:

(a) a bus interface in which a request of operand data is given a higher priority than a request of command fetch;

(b) an access register storing data about the previous access, said micro-processor, if a request of operand data is made while burst transfer access for command fetch is being carried out, taking command fetch access in preference to operand data access until a first or second signal is transmitted, said first signal indicating that a memory is put in such a condition that burst transfer of the next access can be carried out, said second signal indicating that burst transfer should be completed.

9. A micro-processor comprising:

(a) a bus interface in which a request of operand data is given a higher priority than a request of command fetch;

(b) an access register storing data about the previous access, said micro-processor, if a request of operand data is made while burst transfer access for command fetch is being carried out, taking command fetch access in preference to operand data access when first and second signals are transmitted, said first signal indicating that a memory is put in such a condition that burst transfer of the next access can be carried out, said second signal indicating that burst transfer should be completed.

10. A method of driving a micro-processor, comprising the step of taking command fetch access in preference to operand data access in the next bus access, when the following conditions are all fulfilled:
   (a) the previous bus access is command fetch access;
   (b) there is vacancy in pre-fetch queue FIFO;
   (c) there is generated operand data access; and
   (d) a memory is in such a condition that burst transfer can be carried out.

11. A method of driving a micro-processor, comprising the steps of
   (a) storing a condition at which burst transfer of command fetch is completed;
   (b) detecting a boundary condition of a memory, based on the next command fetch address and said condition; and
   (c) judging whether command fetch access should be taken preference over operand data access in the next bus access in accordance with a result of detection carried out in said step (b), when the following conditions are all fulfilled:
      (c1) the previous bus access is command fetch access;
      (c2) there is vacancy in pre-fetch queue FIFO;
      (c3) there is generated operand data access; and
      (c4) a memory is in such a condition that burst transfer can be carried out.

12. A method of driving a micro-processor, comprising the steps of
   (a) counting the number of burst transfer;
   (b) storing the number of burst transfer in command fetch;
   (c) comparing said number in said step (a) to said number in said step (b); and
   (d) judging whether command fetch access should be taken preference over operand data access in the next bus access in accordance with a result of comparison carried out in said step (c), when the following conditions are all fulfilled:
      (d1) the previous bus access is command fetch access;
      (d2) there is vacancy in pre-fetch queue FIFO;
      (d3) there is generated operand data access; and
      (d4) a memory is in such a condition that burst transfer can be carried out.

13. A method of driving a micro-processor, comprising the steps of
   (a) detecting an amount of command code in pre-fetch queue FIFO;
   (b) judging whether command fetch access should be taken preference over operand data access in the next bus access, if said amount of command code is smaller than a predetermined amount, and if the following conditions are all fulfilled:
      (b1) the previous bus access is command fetch access;
      (b2) there is vacancy in pre-fetch queue FIFO;
      (b3) there is generated operand data access; and
      (b4) a memory is in such a condition that burst transfer can be carried out.

14. A method of driving a micro-processor, comprising the steps of:
   (a) giving a priority to a request of operand data over a request of command fetch
   (b) storing data about the previous access; and
   (c) if a request of operand data is made while burst transfer access for command fetch is being carried out, determining whether burst transfer should be interrupted or continued, based on data stored in said access register, wherein command fetch access is taken preference over operand data access in said step (c), while a first signal is being transmitted which first signal indicates that a memory is put in such a condition that burst transfer of the next access can be carried out.

15. A method of driving a micro-processor, comprising the steps of:
   (a) giving a priority to a request of operand data over a request of command fetch;
   (b) storing data about the previous access; and
   (c) if a request of operand data is made while burst transfer access for command fetch is being carried out, taking command fetch access in preference to operand data access until a first or second signal is transmitted, said first signal indicating that a memory is put in such a condition that burst transfer of the next access can be carried out, said second signal indicating that burst transfer should be completed.

16. A method of driving a micro-processor, comprising the steps of:
   (a) giving a priority to a request of operand data over a request of command fetch;
   (b) storing data about the previous access; and
   (c) if a request of operand data is made while burst transfer access for command fetch is being carried out, taking command fetch access in preference to operand data access when first and second signals are transmitted, said first signal indicating that a memory is put in such a condition that burst transfer of the next access can be carried out, said second signal indicating that burst transfer should be completed.

* * * * *